US012757082B2

(12) United States Patent
Paladugu et al.

(10) Patent No.: US 12,757,082 B2
(45) Date of Patent: Oct. 6, 2026

(54) DUAL CONNECTIVITY MOBILITY MANAGEMENT WITH L2 UE-TO-NETWORK RELAY

(71) Applicant: QUALCOMM Incorporated, San Diego, CA (US)

(72) Inventors: Karthika Paladugu, Hyderabad (IN); Gavin Bernard Horn, La Jolla, CA (US); Peng Cheng, Beijing (CN); Ozcan Ozturk, San Diego, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 18/286,992

(22) PCT Filed: Jun. 7, 2021

(86) PCT No.: PCT/CN2021/098563
§ 371 (c)(1),
(2) Date: Oct. 13, 2023

(87) PCT Pub. No.: WO2022/256958
PCT Pub. Date: Dec. 15, 2022

(65) Prior Publication Data

US 2024/0205764 A1 Jun. 20, 2024

(51) Int. Cl.

| | |
|---|---|
| ***H04W 36/00*** | (2009.01) |
| ***H04W 36/30*** | (2009.01) |
| *H04W 88/04* | (2009.01) |

(52) U.S. Cl.
CPC . *H04W 36/00692* (2023.05); *H04W 36/0058* (2018.08); *H04W 36/0069* (2018.08);
(Continued)

(58) Field of Classification Search
CPC ....... H04W 36/00692; H04W 36/0058; H04W 36/033; H04W 36/035; H04W 36/305;
(Continued)

(56) References Cited

U.S. PATENT DOCUMENTS

| | | | | |
|---|---|---|---|---|
| 10,575,228 B2 * | 2/2020 | Aminaka | .............. | H04W 76/32 |
| 2019/0253939 A1 * | 8/2019 | Zhang | .............. | H04W 36/0038 |

(Continued)

FOREIGN PATENT DOCUMENTS

| | | |
|---|---|---|
| CN | 110972214 A | 4/2020 |
| CN | 111316695 A | 6/2020 |

(Continued)

OTHER PUBLICATIONS

Huawei: "MeNB Mobility Procedure", 3GPP TSG-RAN WG3 Meeting #83, R3-140117, 3rd Generation Partnership Project, Mobile Competence Centre, 650, Route Des Lucioles, F-06921 Sophia-Antipolis Cedex, France, vol. RAN WG3, No. Prague, Czech Republic, Feb. 10, 2014-Feb. 14, 2014, Jan. 31, 2014, pp. 1-5, XP050755577, the whole document.

(Continued)

*Primary Examiner* — Kan Yuen
(74) *Attorney, Agent, or Firm* — Procopio, Cory, Hargreaves & Savitch LLP

(57) ABSTRACT

A remote UE may transmit, to at least one of a source master network entity or a target master network entity, an indication of a first entity change and a second entity change. The remote UE may receive, from the target master network entity, a measurement configuration during an RRC reestablishment procedure with the target master network entity. The remote UE may transmit, to the target master network entity during the RRC reestablishment procedure, one or more measurements corresponding to the second entity change. The remote UE may receive, from the target master
(Continued)

network entity, a dual connectivity configuration based on the transmitted one or more measurements. The dual connectivity configuration may correspond to the first entity change and the second entity change. The remote UE may communicate with the target master network entity and the target secondary network entity based on the dual connectivity configuration.

15 Claims, 17 Drawing Sheets

(52) U.S. Cl.
CPC ....... *H04W 36/033* (2023.05); *H04W 36/035* (2023.05); *H04W 36/305* (2018.08); *H04W 88/04* (2013.01)

(58) Field of Classification Search
CPC ............. H04W 36/0069; H04W 88/04; H04W 36/0094; H04W 76/15; H04W 76/19
See application file for complete search history.

(56) References Cited

U.S. PATENT DOCUMENTS

| | | | |
|---|---|---|---|
| 2019/0335369 A1 | 10/2019 | Zhang et al. | |
| 2020/0178128 A1 | 6/2020 | Ingale et al. | |
| 2021/0378051 A1* | 12/2021 | Kimba Dit Adamou | H04W 76/10 |
| 2022/0053390 A1* | 2/2022 | Kim | H04W 36/00695 |
| 2022/0104098 A1 | 3/2022 | Takahashi et al. | |
| 2023/0379771 A1* | 11/2023 | Selvaganapathy | H04W 36/00698 |

FOREIGN PATENT DOCUMENTS

| | | |
|---|---|---|
| CN | 111937435 A | 11/2020 |
| CN | 112889347 A | 6/2021 |
| WO | 2018204130 A1 | 11/2018 |
| WO | 2018204321 A1 | 11/2018 |
| WO | 2018227461 A1 | 12/2018 |
| WO | 2020089225 A1 | 5/2020 |
| WO | 2020166020 A1 | 8/2020 |

OTHER PUBLICATIONS

Supplementary European Search Report—EP21944472—Search Authority—Berlin—Jan. 23, 2025.
Google Inc., "Correction to Dual Connectivity", 3GPP TSG-RAN2 Meeting #106, R2-1906818, May 17, 2019 (May 17, 2019), 9 Pages, The Whole Document.
International Search Report and Written Opinion—PCT/CN2021/098563—ISA/EPO—Feb. 28, 2022.

* cited by examiner

DUAL CONNECTIVITY MOBILITY MANAGEMENT WITH L2 UE-TO-NETWORK RELAY

CROSS REFERENCE TO RELATED APPLICATION(S)

This application is National Stage Application filed under 35 U.S.C. § 371 of PCT International Application Serial No. PCT/CN2021/098563 entitled "DUAL CONNECTIVITY MOBILITY MANAGEMENT WITH L2 UE-TO-NETWORK RELAY" and filed on Jun. 7, 2021, which is expressly incorporated by reference herein in its entirety.

TECHNICAL FIELD

The present disclosure relates generally to communication systems, and more particularly, to mobility management with dual connectivity and UE-to-network relay in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a remote user equipment (UE). The apparatus may transmit, to at least one of a source master network entity or a target master network entity, an indication of a first entity change from the source master network entity to the target master network entity and a second entity change from a source secondary network entity to a target secondary network entity. The remote UE may be connected to the source master network entity through a first relayed link via a first relay UE before the first entity change. The apparatus may receive, from the target master network entity, a measurement configuration during an RRC reestablishment procedure with the target master network entity. The apparatus may transmit, to the target master network entity during the RRC reestablishment procedure, one or more measurements corresponding to the second entity change. The apparatus may receive, from the target master network entity, a dual connectivity configuration based on the transmitted one or more measurements. The dual connectivity configuration may correspond to the first entity change and the second entity change. The remote UE may be connected to the target master network entity through a second relayed link via a second relay UE after the first entity change. The apparatus may communicate with the target master network entity and the target secondary network entity based on the dual connectivity configuration.

In an aspect of the disclosure, a method, a computer-readable medium, and an apparatus are provided. The apparatus may be a source master network entity. The apparatus may receive, from a remote UE, an indication of a first entity change from the source master network entity to a target master network entity. The apparatus may transmit, to the target master network entity, a preparation indication to prepare the target master network entity for a handover from the source master network entity. The apparatus may transmit, to the remote UE, a dual connectivity configuration based on the indication of the first entity change. The remote UE may complete the first entity change based on the dual connectivity configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
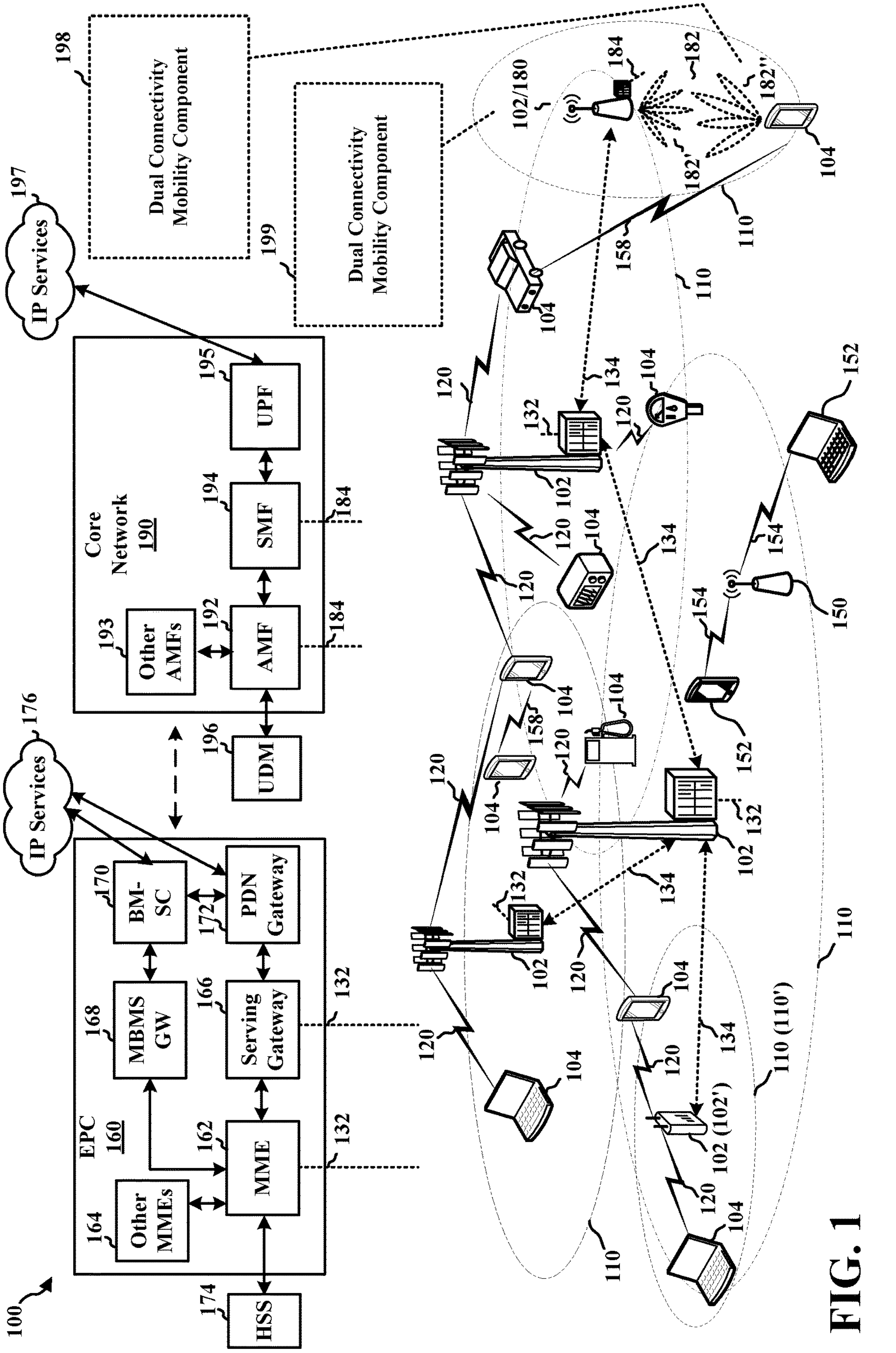
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., SI interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHZ" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the remote UE 104 may include a dual connectivity mobility component 198 that may be configured to transmit, to at least one of a source master network entity or a target master network entity, an indication of a first entity change from the source master network entity to the target master network entity and a second entity change from a source secondary network entity to a target secondary network entity. The remote UE may be connected to the source master network entity through a first relayed link via a first relay UE before the first entity change. The dual connectivity mobility component 198 may be configured to receive, from the target master network entity, a measurement configuration during an RRC reestablishment procedure with the target master network entity. The dual connectivity mobility component 198 may be configured to transmit, to the target master network entity during the RRC reestablishment procedure, one or more measurements corresponding to the second entity change. The dual connectivity mobility component 198 may be configured to receive, from the target master network entity, a dual connectivity configuration based on the transmitted one or more measurements. The dual connectivity configuration may correspond to the first entity change and the second entity change. The remote UE may be connected to the target master network entity through a second relayed link via a second relay UE after the first entity change. The dual connectivity mobility component 198 may be configured to communicate with the target master network entity and the target secondary network entity based on the dual connectivity configuration. In certain aspects, the base station/source master network entity 180 may include a dual connectivity mobility component 199 that may be configured to receive, from a remote UE, an indication of a first entity change from the source master network entity to a target master network entity. The dual connectivity mobility component 199 may be configured to transmit, to the target master network entity, a preparation indication to prepare the target master network entity for a handover from the source master network entity. The dual connectivity mobility component 199 may be configured to transmit, to the remote UE, a dual connectivity configuration based on the indication of the first entity change. The remote UE may complete the first entity change based on the dual connectivity configuration. Although the following description may be focused on 5G NR, the concepts described herein may be applicable to other similar areas, such as LTE, LTE-A, CDMA, GSM, and other wireless technologies.

Figures 2A, 2B, 2C, 2D:
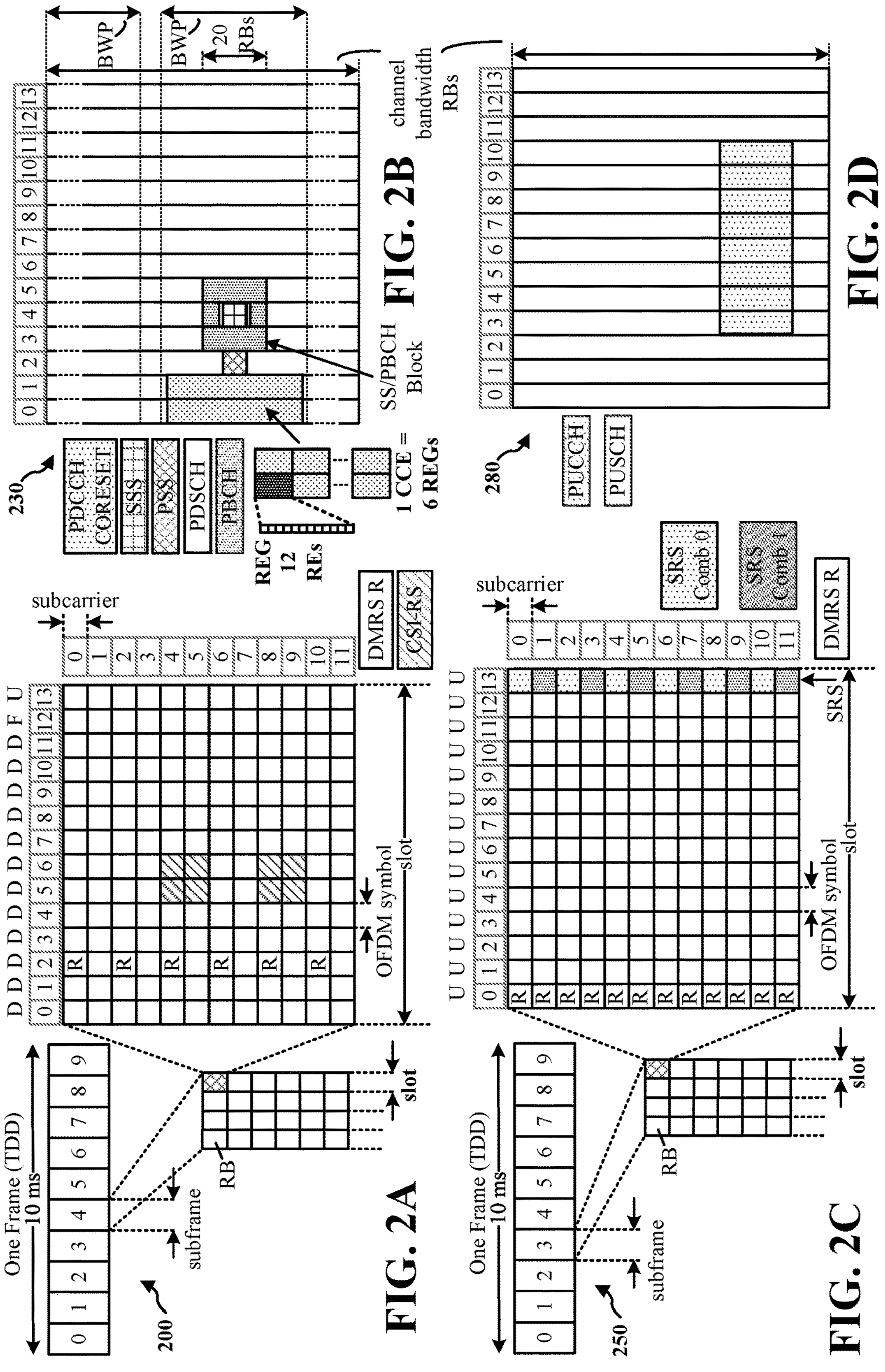
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
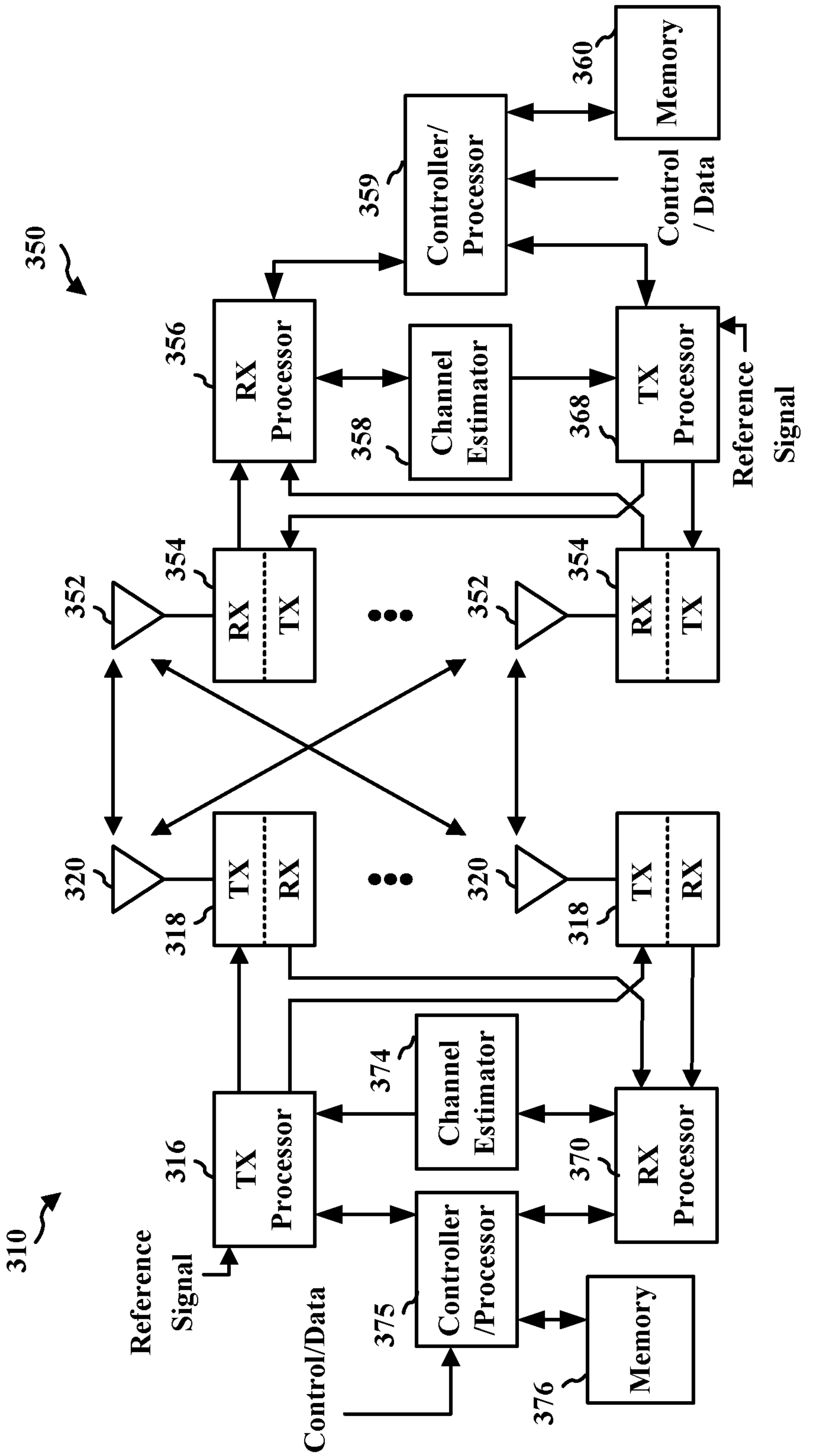
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4B:
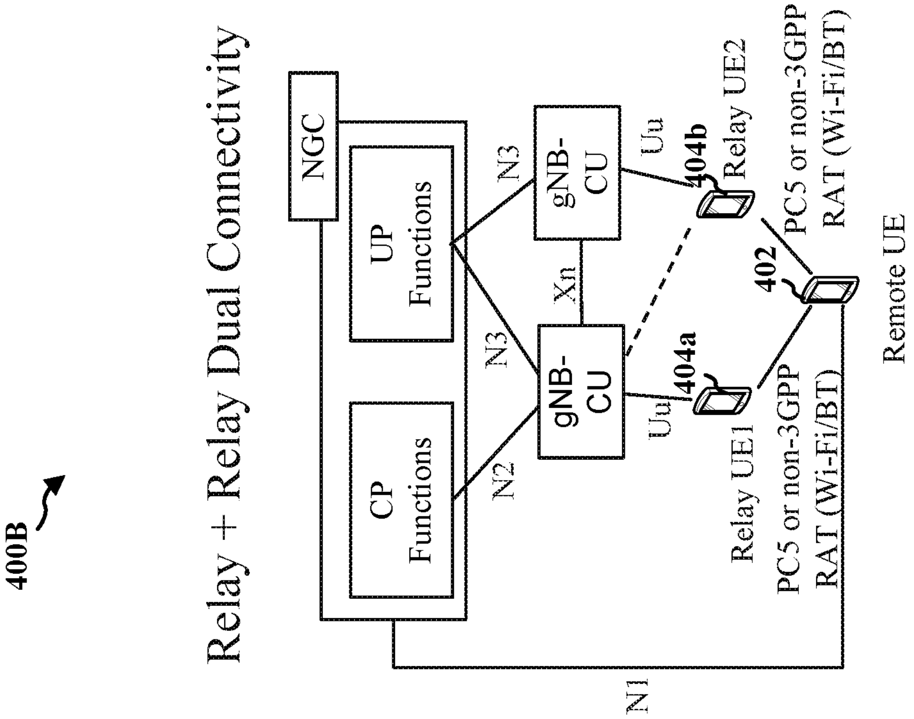
FIGS. 4A and 4B are block diagrams illustrating dual connectivity configurations including at least one UE-to-network relay connection.
Figure 4A:
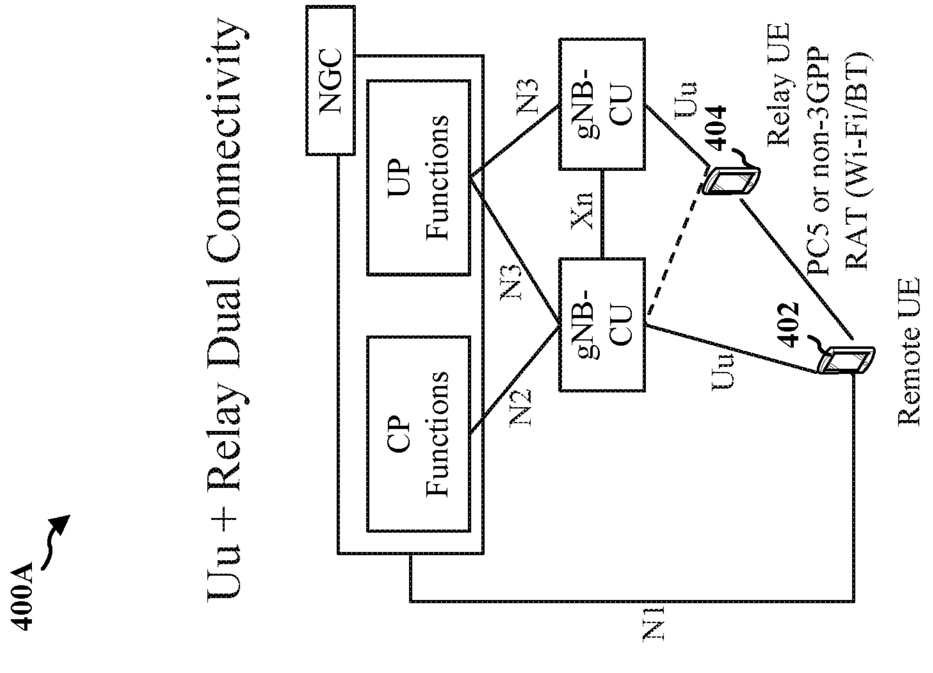

FIGS. 4A and 4B are block diagrams 400A and 400B illustrating dual connectivity configurations including at least one UE-to-network relay connection. FIG. 4A illustrates a dual connectivity configuration at the remote UE 402 including one direct Uu link to the network and one relayed link to the network via a relay UE 404. The base station involved in the direct Uu link and the base station involved in the relayed link may be the same or may be different. FIG. 4B illustrates a dual connectivity configuration at the remote UE 402 including a first relayed link to the network via a first relay UE 404*a* and a second relayed link to the network via a second relay UE 404*b*. The base station involved in the first relayed link and the base station involved in the second relayed link may be the same or may be different. The local link between the remote UE 402 and a relay UE 404 may be a PC5 link (i.e., a sidelink), or may be a non-3GPP RAT link (e.g., a Wi-Fi link, a Bluetooth link, a Bluetooth Low Energy "LE" link, etc.). Irrespective of the RAT used, in a dual connectivity configuration, the first established connection may be the primary connection, and the base station associated with the first/primary connection may act as the master node (MN) or the master cell group (MCG). When the remote UE 402 is connected to two different base stations in a dual connectivity configuration, the base station associated with the first/primary connection may serve as the MN or MCG, and the base station associated with second/secondary connection may serve as the secondary node (SN) or the secondary cell group (SCG). When the remote UE 402 is connected to the same base station via two separate links in a dual connectivity configuration, the same base station may act as both an MN and an SN.

Figure 5:
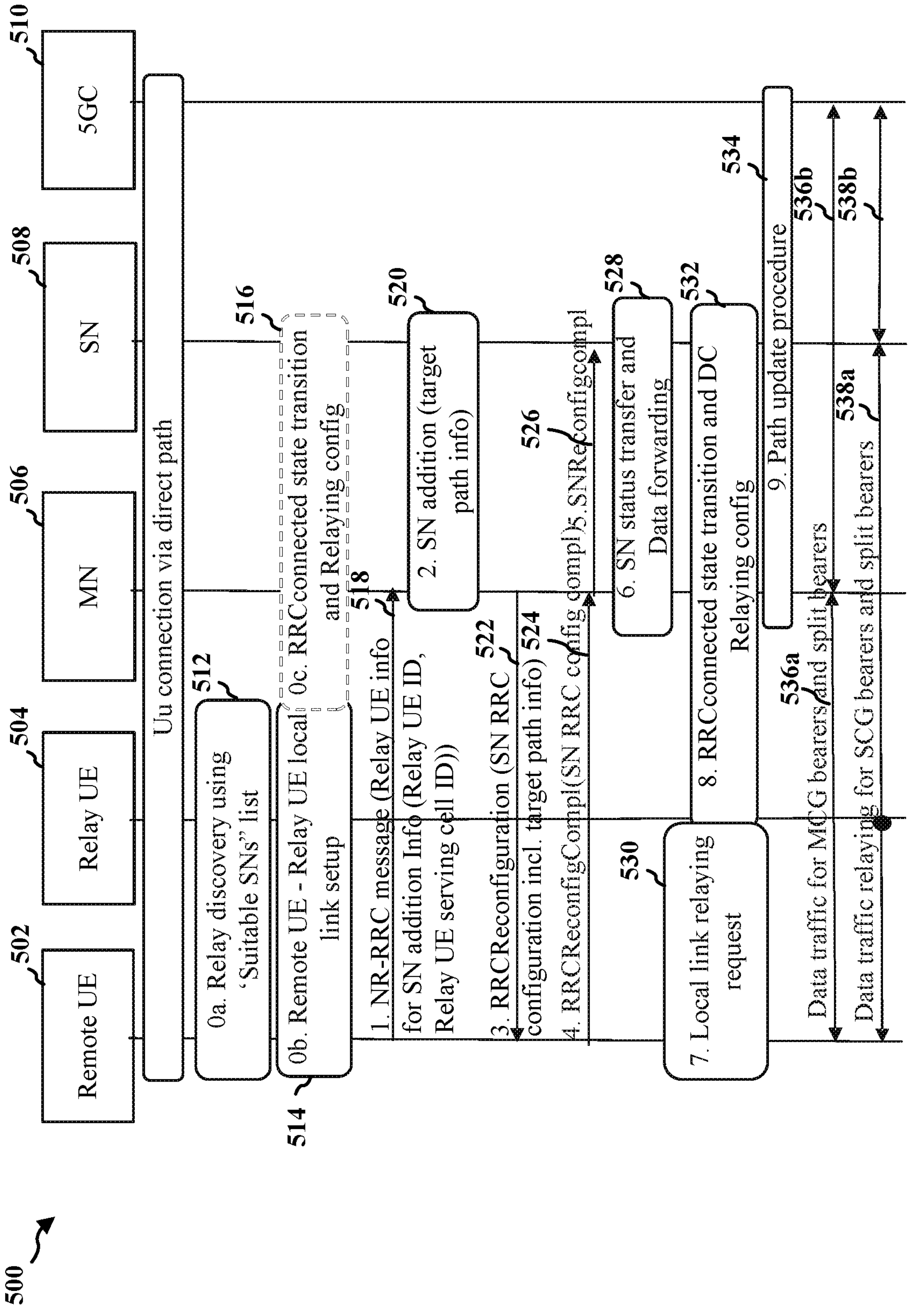
FIG. 5 is a communication flow of an SN addition procedure controlled at the remote UE.

FIG. 5 is a communication flow 500 of an SN addition procedure controlled at the remote UE. An SN addition procedure may refer to a procedure of establishing a new secondary link with an SN. The primary connection between the remote UE 502 and the MN 506 may be a direct Uu link. At 512, the remote UE 502 may perform relay discovery using a list of suitable SNs. A relay UE 504 may be discovered. At 514, the remote UE 502 may set up a local link with the relay UE 504. In one configuration, at 516, if the relay UE 504 is not already in the RRC_CONNECTED state (the relay UE 504 may be in either the RRC_IDLE/RRC_INACTIVE state or the RRC_CONNECTED state before the SN addition procedure), the relay UE 504 may transition to the RRC_CONNECTED state. The SN 508 may transmit the relaying configuration to the relay UE 504 in an RRC Reconfiguration message. At 518, the remote UE 502 may inform the MN 506 about the local connection that is available using an RRC message. The RRC message may be a sidelinkUEInformationNR message (in case the local link is a PC5 link) or a non-3GPPConnectionInformation message (in case the local link is a non-3GPP RAT link). In particular, the remote UE 502 may transmit the relay UE information associated with the SN addition procedure to the MN 506 in the RRC message. The relay UE information associated with the SN addition procedure may include an identity of the relay UE 504 and an identity of the relay UE serving cell (i.e., the identity of the SN 508). The MN 506 may decide whether to add the cell corresponding to the relay UE 504 (i.e., the relay UE serving cell) for an SN connection for the remote UE 502. At 520, the MN 506 may perform an SN addition operation with the SN 508. In particular, the MN 506 may transmit the target path information to the SN 508. At 522, the MN 506 may transmit to the remote UE 502 an SN 508 configuration (e.g., SN RRC configuration) including the target path information in an RRC message. In particular, the RRC message may be an RRC Reconfiguration message. The remote UE 502 may thus learn the relay path to use for the SN addition operation. At 524, the remote UE 502 may transmit to the MN 506 an indication of SN configuration completion (e.g., SN RRC configuration completion) in an RRC message. The RRC message may be an RRC Reconfiguration Complete message. At 526, the MN 506 may transmit to the SN 508 an indication of SN reconfiguration completion. At 528, the MN 506 and the SN 508 may perform SN status transfer and data forwarding operations. At 530, the remote UE 502 may transmit a request to relay data over the local link the relay UE 504. In case the local link is previously existing, the remote UE 502 may modify the local link to activate the L2 relaying. In one configuration, if the relay UE 504 is not in or transitioned to the RRC_CONNECTED state at 516, at 532, the relay UE 504 may transition into the RRC_CONNECTED state. Further, the SN 508 may transmit the dual connectivity relaying configuration to the relay UE 504 in an RRC Reconfiguration message. The relay UE 504, the MN 506, and the SN 508 may exchange dual connectivity relaying configuration information. At 534, the MN 506, the SN 508, and the network 510 may perform a path update procedure. MCG bearers or split bearers may be configured between the remote UE 502 and the network 510 via the MN 506 to carry data traffic 536. The data traffic 536 may include a first leg 536*a* transmitted between the remote UE 502 and the MN 506 and a second leg 536*b* transmitted between the MN 506 and the network 510. SCG bearers or split bearers may be configured between the remote UE 502 and the network 510 via the relay UE 504 and the SN 508 to carry data traffic 538. In particular, the MN 506 may transmit the relaying configuration for SCG bearers or split bearers to the relay UE 504. The data traffic 538 may include a first leg transmitted 538*a* between the remote UE 502 and the SN 508 via the relay UE 504 and a second leg 538*b* transmitted between the SN 508 and the network 510.

Therefore, the relay UE 504 may transition to the RRC_CONNECTED state: (1) on setting up a local link with the remote UE 502 for the relaying connection (516), (2) on receiving a request from the remote UE 502 on the already established local link for starting the relaying connection after the SN addition operation (530, 532), or (3) when the SN 508 pages the relay UE 504 and transitions the relay UE 504 to the RRC_CONNECTED state (532). It may be beneficial to defer the transition of the relay UE 504 to the RRC_CONNECTED state until 530 or 532 because a transition at 516 may be an unnecessary and wasted transition if the relaying setup is subsequently not successful.

Figure 6:
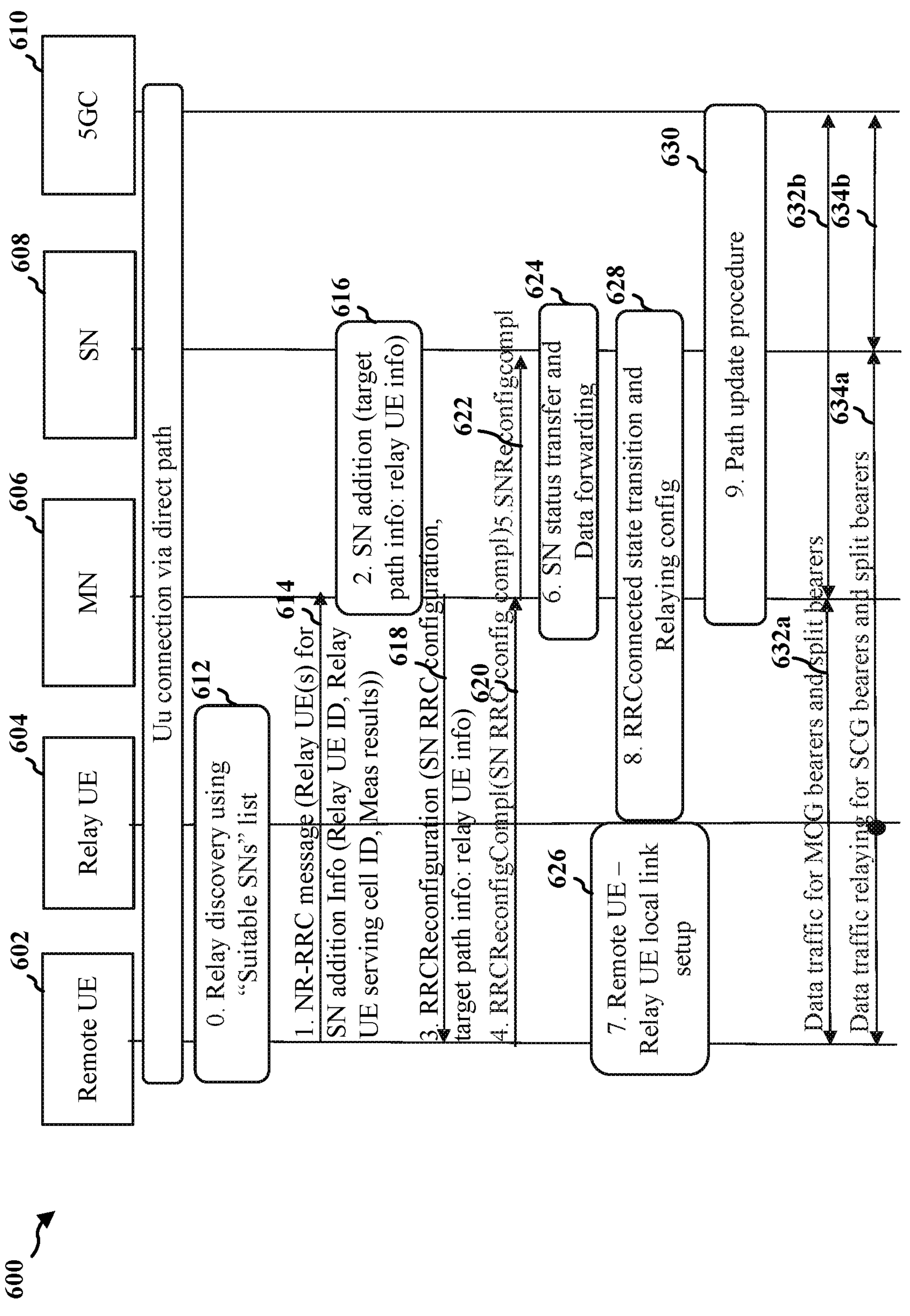
FIG. 6 is a communication flow of an SN addition procedure controlled at the MN.

FIG. 6 is a communication flow 600 of an SN addition procedure controlled at the MN. The primary connection between the remote UE 602 and the MN 606 may be a direct Uu link. At 612, the remote UE 602 may perform relay discovery using a list of suitable SNs. The MN 606 may configure the remote UE 602 to perform measurements of relay UEs. At 614, the remote UE 602 may report the discovered relay UEs to the MN 606 in an RRC message over the direct Uu connection for the SN addition procedure. The RRC message may be a measurement report, a sidelinkUEInformationNR message (in case a discovered relay UE is connectable over a PC5 link) or a non-3GPPConnectionInformation message (in case a discovered relay UE is connectable over a non-3GPP RAT link). In particular, the remote UE 602 may transmit the relay UE information associated with the SN addition procedure to the MN 606 in the RRC message. The relay UE information associated with the SN addition procedure may include identities of the relay UEs, identities of the relay UE serving cells, and/or measurement results for the PC5 links or the non-3GPP RAT links. The MN 606 may select a suitable relay UE 604 from the discovered relay UEs. The SN 608 may be the serving cell of the suitable relay UE 604. At 616, the MN 606 may prepare the SN 608 for the SN addition operation. In particular, the MN 606 may transmit the target path information and the relay UE 604 information to the SN 608. At 618, the MN 606 may transmit to the remote UE 602 an SN 608 configuration (e.g., SN RRC configuration) including the target path information and the relay UE 604 information (e.g., the identity of the relay UE 604) in an RRC message. In particular, the RRC message may be an RRC Reconfiguration message. The remote UE 602 may thus learn the relay path to use for the SN addition operation. At 620, the remote UE 602 may transmit to the MN 606 an indication of SN configuration completion (e.g., SN RRC configuration completion) in an RRC message. The RRC message may be an RRC Reconfiguration Complete message. At 622, the MN 606 may transmit to the SN 608 an indication of SN reconfiguration completion. At 624, the MN 606 and the SN 608 may perform SN status transfer and data forwarding operations. At 626, the remote UE 602 and the relay UE 604 may set up a local link based on local procedures. The remote UE 602 may indicate to the relay UE 604 that the local link is set up for the L2 relaying. In one configuration, if the relay UE 604 is not in the RRC_CONNECTED state, at 628, the relay UE 604 may transition into the RRC_CONNECTED state. Further, the SN 608 may transmit the dual connectivity relaying configuration to the relay UE 604 in an RRC Reconfiguration message. The relaying configuration may include the Uu logical channel configuration. The relay UE 604, the MN 606, and the SN 608 may exchange dual connectivity relaying configuration information. At 630, the MN 606, the SN 608, and the network 610 may perform a path update procedure. MCG bearers or split bearers may be configured between the remote UE 602 and the network 610 via the MN 606 to carry data traffic 632. The data traffic 632 may include a first leg 632*a* transmitted between the remote UE 602 and the MN 606 and a second leg transmitted 632*b* between the MN 606 and the network 610. SCG bearers or split bearers may be configured between the remote UE 602 and the network 610 via the relay UE 604 and the SN 608 to carry data traffic 634. In particular, the MN 606 may transmit the relaying configuration for SCG bearers or split bearers to the relay UE 604. The data traffic 634 may include a first leg 634*a* transmitted between the remote UE 602 and the SN 608 via the relay UE 604 and a second leg 634*b* transmitted between the SN 608 and the network 610.

Figure 7:
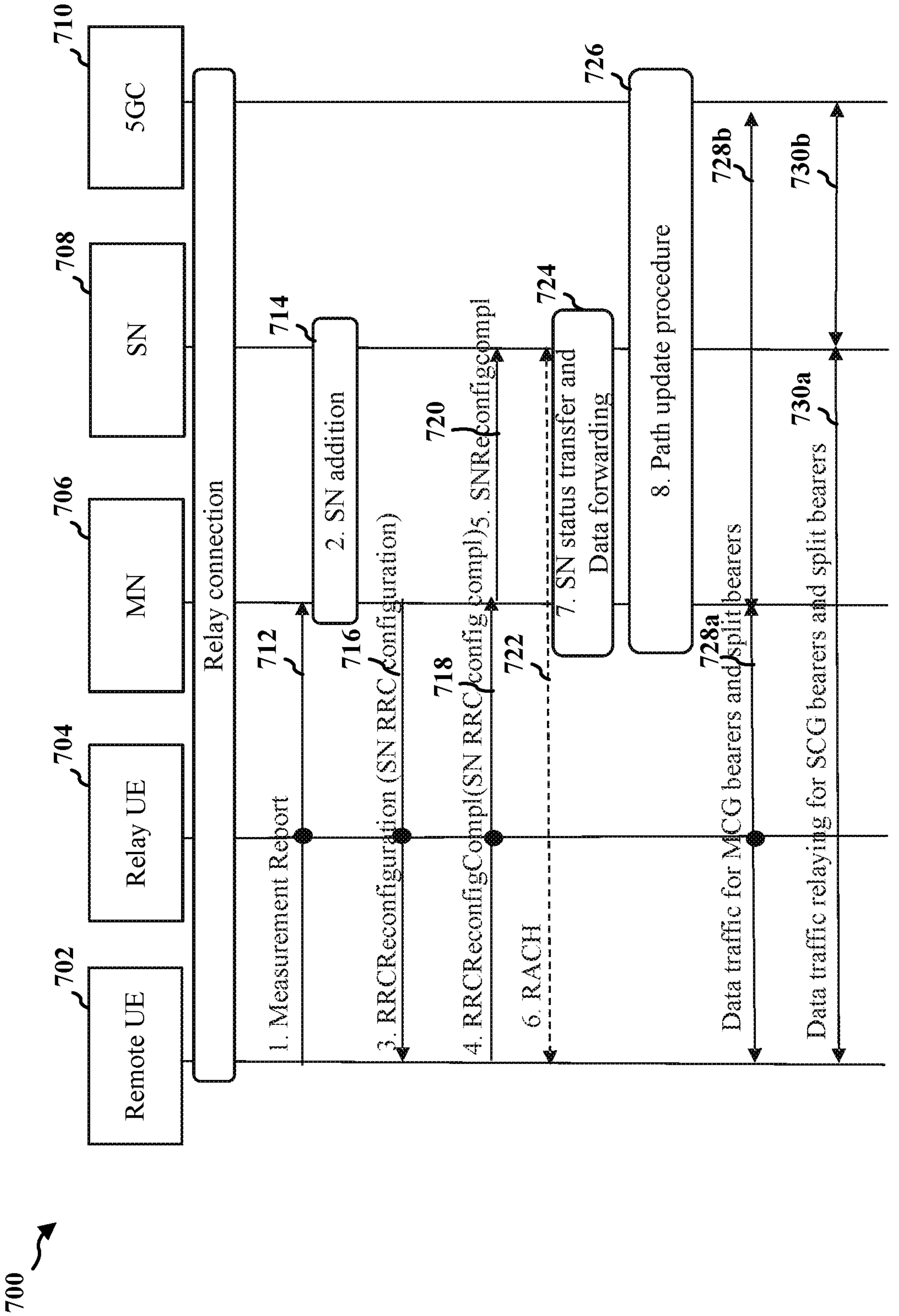
FIG. 7 is a communication flow of an SN addition procedure controlled at the MN.

FIG. 7 is a communication flow 700 of an SN addition procedure controlled at the MN. The primary connection between the remote UE 702 and the MN 706 may be a relayed link via the relay UE 704. A similar procedure as the SN addition procedure in NR-DC may be performed. At 712, the remote UE 702 may transmit a measurement report of the discovered SNs to the MN 706. The MN 706 may select an SN 708 from the discovered SNs. At 714, the MN 706 may perform an SN addition operation with the SN 708. At 716, the MN 706 may transmit an SN configuration (e.g., an SN RRC configuration) to the remote UE 702 in an RRC message. The RRC message may be an RRC Reconfiguration message transmitted over the primary relayed link via the relay UE 704. At 718, the remote UE 702 may transmit to the MN 706 an indication of SN configuration completion (e.g., SN RRC configuration completion) in an RRC message. The RRC message may be an RRC reconfiguration complete message transmitted over the primary relayed link via the relay UE 704. At 720, the MN 706 may transmit to the SN 708 an indication of SN reconfiguration completion. At 722, the remote UE 702 may perform a random access channel (RACH) procedure to establish a direct Uu connection with the SN 708. At 724, the MN 706 and the SN 708 may perform SN status transfer and data forwarding operations. At 726, the MN 706, the SN 708, and the network 710 may perform a path update procedure. MCG bearers or split bearers may be configured between the remote UE 702 and the network 710 via the relay UE 704 and the MN 706 to carry data traffic 728. The data traffic 728 may include a first leg 728*a* transmitted between the remote UE 702 and the MN 706 via the relay UE 704 and a second leg 728*b* transmitted between the MN 706 and the network 710. SCG bearers or split bearers may be configured between the remote UE 702 and the network 710 via the SN 708 to carry data traffic 730. The data traffic 730 may include a first leg 730*a* transmitted between the remote UE 702 and the SN 708 and a second leg 730*b* transmitted between the SN 708 and the network 710.

Figure 8:
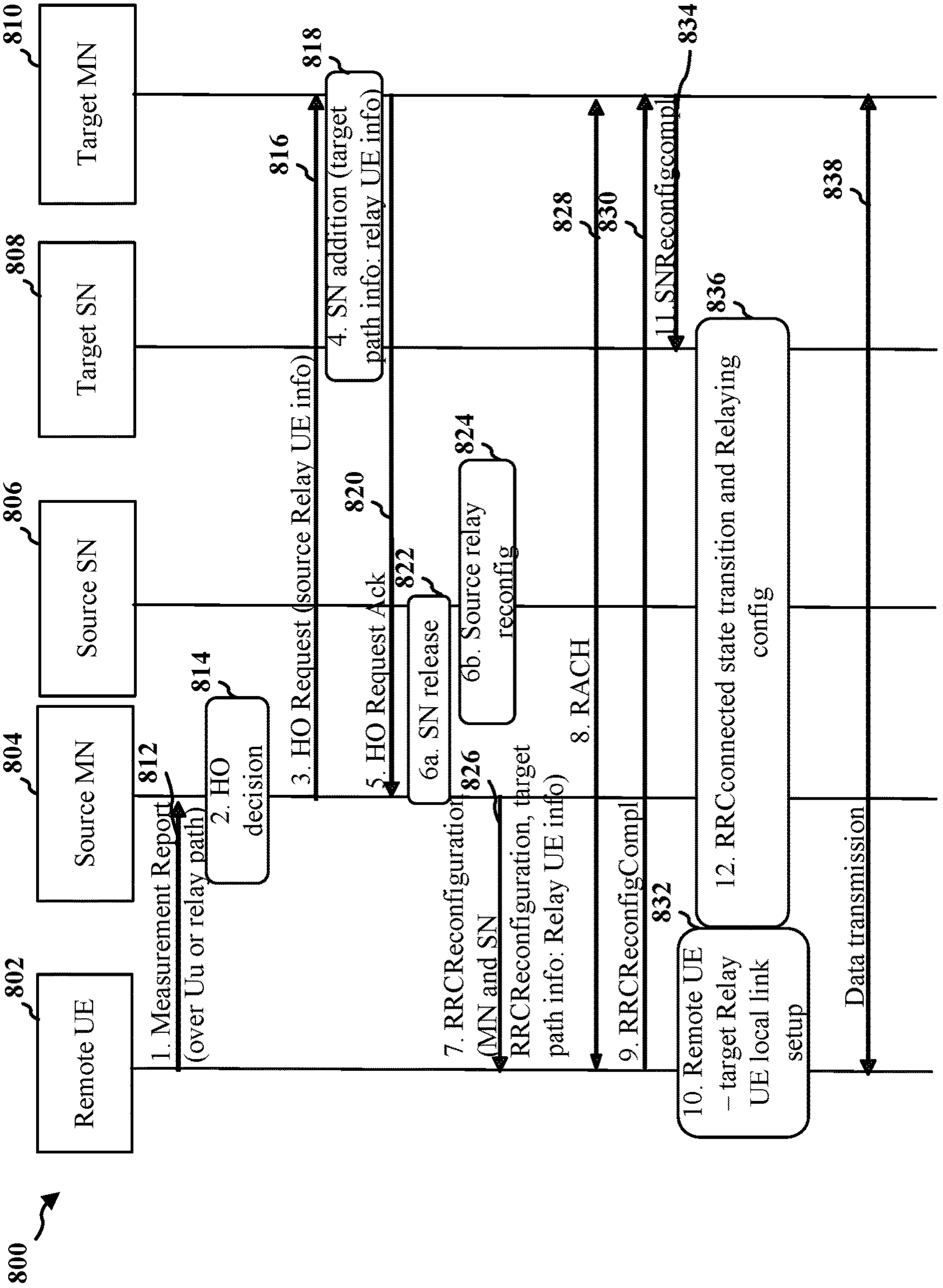
FIG. 8 is communication flow of a method of mobility management with dual connectivity.

FIG. 8 is communication flow 800 of a method of mobility management with dual connectivity. The remote UE 802 may be connected to the MN (either source or target) via a direct Uu link, and may be connected to the SN (either source or target) over a relayed link via a relay UE (not shown). A handover based MN change from the source MN 804 to the target MN 810 may be performed. An SN change from the source SN 806 to the target SN 808 may also be performed. At 812, the remote UE 802 may transmit to the source MN 804 a measurement report. The remote UE 802 may transmit the measure report over either the direct Uu link or the relay path. At 814, the source MN 804 may make a handover decision. At 816, the source MN 804 may transmit to the target MN 810 a handover request. The handover request may include the source SN 806 information and the information of the source relay UE associated with the source SN 806. At 818, the target MN 810 may perform an SN addition operation with the target SN 808. In particular, the target MN 810 may transmit to the target SN 808 the target path information including the target relay UE information. At 820, the target MN 810 may transmit to the source MN 804 a handover request acknowledgement message. At 822, based on the change from the source SN 806 to the target SN 808, the source MN 804 may perform an SN release operation with the source SN 806. At 824, the source SN 806 may reconfigure the source relay UE based on the pending change from the source SN 806 to the target SN 808. At 826, the source MN 804 may transmit to the remote UE 802 a reconfiguration message in an RRC message. The RRC message may be an RRC Reconfiguration message. The reconfiguration message may include MN and SN reconfiguration messages and the target path information including the target relay UE information. At 828, the remote UE 802 may establish a Uu link with the target MN 810 by performing a RACH procedure. At 830, the remote UE 802 may transmit an indication of reconfiguration completion (e.g., an RRC reconfiguration complete) to the target MN 810. At 834, the target MN 810 may transmit to the target SN 808 an indication of SN reconfiguration completion. At 832, the remote UE 802 may set up a local link with the target relay UE if a local link is not already set up. At 836, the target relay UE may transition into the RRC_CONNECTED state, and the target SN 808 may configure the target relay UE with the relaying configuration. Accordingly, the remote UE 802 may communicate with the target SN 808 via the target relay UE. At 838, the remote UE 802 may communicate with the target MN 810 via a direct Uu link and with the target SN 808 via the target relay UE.

In some configurations, an MN change from a source MN to a target MN may be performed without an SN change. In some configurations, the target MN 810 may decide whether to maintain the relay path or change the relay path. In one configuration, the target MN 810 may decide to change the SN based on the measurements reported by the remote UE 802, if available. At 812, remote UE 802 may provide measurements of the candidate target relay UEs. In one configuration, the remote UE 802 may transmit to the target MN 810 a request to maintain the same SN or to release the SN. The remote UE 802 may transmit at 812 the request to maintain the same SN or to release the SN. In other configurations, the remote UE 802 may transmit the request to maintain the same SN or to release the SN to the source MN 804 in a sidelinkUEInformationNR message (in case the local link with the relay UE is a PC5 link) or a non-3GPPConnectionInformation message (in case the local link with the relay UE is a non-3GPP RAT link). Subsequently, if the remote UE 802 would like to add a new SN for dual connectivity, the remote UE 802 may perform the remote UE controlled SN addition procedure, as described above.

Figure 9:
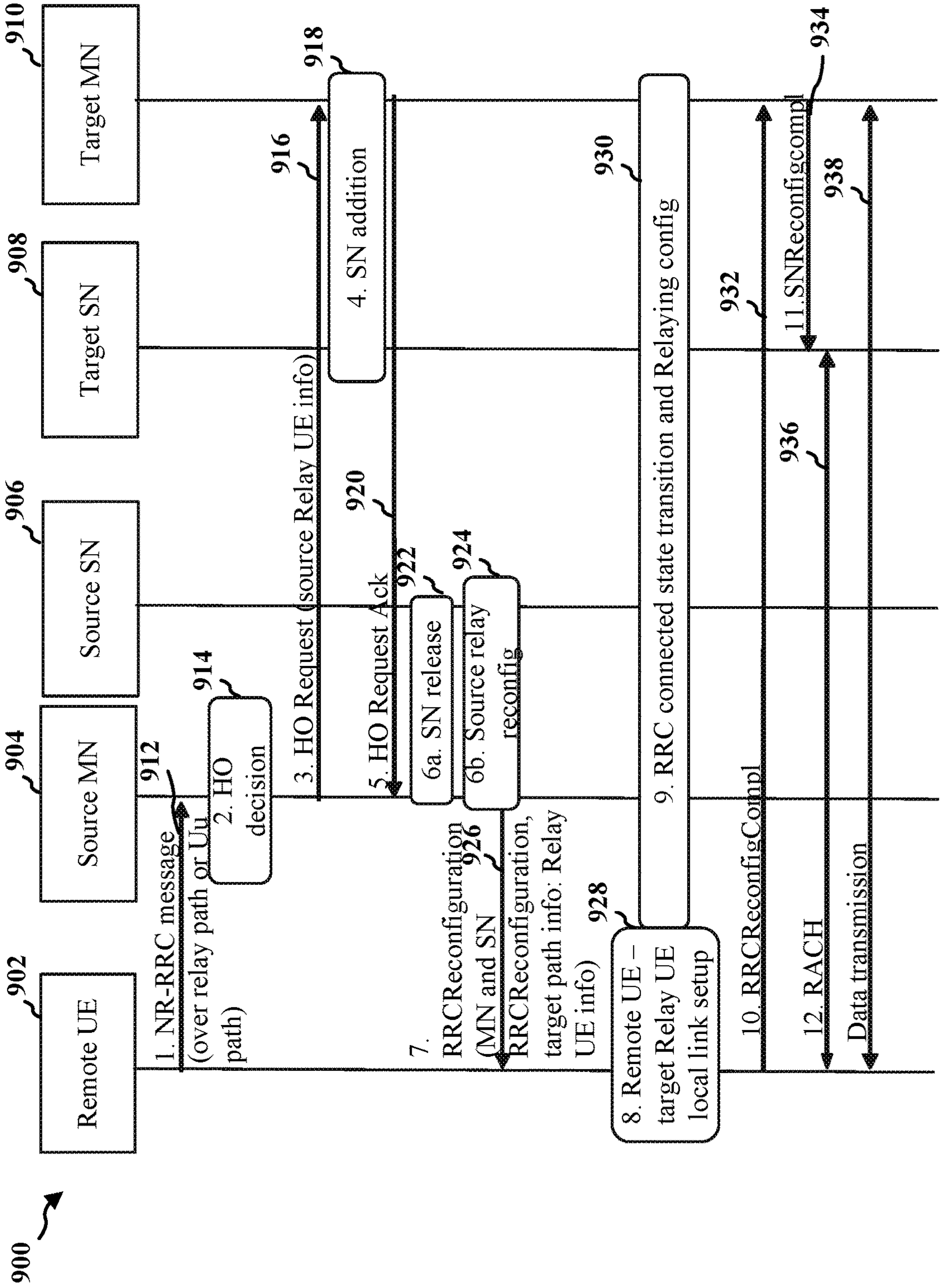
FIG. 9 is communication flow of a method of mobility management with dual connectivity.

FIG. 9 is communication flow 900 of a method of mobility management with dual connectivity. The remote UE 902 may be connected to the MN over a relayed link via a relay UE (not shown), and may be connected to the SN (either source or target) over a direct Uu link. A handover based MN change from the source MN 904 to the target MN 910 may be performed. An SN change from the source SN 906 to the target SN 908 may also be performed. At 912, the remote UE 902 may transmit to the source MN 904 an RRC message. The remote UE 902 may transmit the RRC message over either the relay path or the direct Uu link. The RRC message may include information of suitable target relay UEs. The RRC message may be a measurement report, a sidelinkUEInformationNR message (in case the local link with the relay UE is a PC5 link), or a non-3GPPConnectionInformation message (in case the local link with the relay UE is a non-3GPP RAT link). The remote UE 902 may report the measurements of the suitable target relay UEs, identities of the target relay UEs, and/or identities of target relay UE serving cells. The remote UE 902 may report the selected target relay UE and the target MN to initiate a handover procedure to the cell associated with the target MN. At 914, the source MN 904 may make a handover decision. At 916, the source MN 904 may transmit to the target MN 910 a handover request. The handover request may include the source SN 906 information and information of the source relay UE associated with the source MN 904. At 918, the target MN 910 may perform an SN addition operation with the target SN 908. At 920, the target MN 910 may transmit to the source MN 904 a handover request acknowledgement message. At 922, based on the change from the source SN 906 to the target SN 908, the source MN 904 may perform an SN release operation with the source SN 906. At 924, the source MN 904 or the source SN 906 may reconfigure the source relay UE based on the pending change from the source MN 904 to the target MN 910. At 926, the source MN 904 may transmit to the remote UE 902 a reconfiguration message in an RRC message. The RRC message may be an RRC Reconfiguration message. The reconfiguration message may include MN and SN reconfiguration messages and the target path information including the target relay UE information. At 928, the remote UE 902 may set up a local link with the target relay UE. At 930, the target relay UE may transition into the RRC_CONNECTED state, and the target MN 910 may configure the target relay UE with the relaying configuration. Accordingly, the remote UE 902 may communicate with the target MN 910 via the target relay UE. In some configurations, the target path to the target MN may be direct path, and the remote UE may accordingly set up a direct Uu connection to the target MN. At 932, the remote UE 902 may transmit an indication of reconfiguration completion (e.g., an RRC reconfiguration complete) to the target MN 910. At 934, the target MN 910 may transmit to the target SN 908 an indication of SN reconfiguration completion. At 936, the remote UE 902 may establish a Uu link with the target SN 908 by performing a RACH procedure. At 938, the remote UE 902 may communicate with the target MN 910 over a relayed link via a relay UE and with the target SN 908 via a direct Uu link. In some configurations, it may also be possible to change the MN without changing the SN, as described above.

Figure 10:
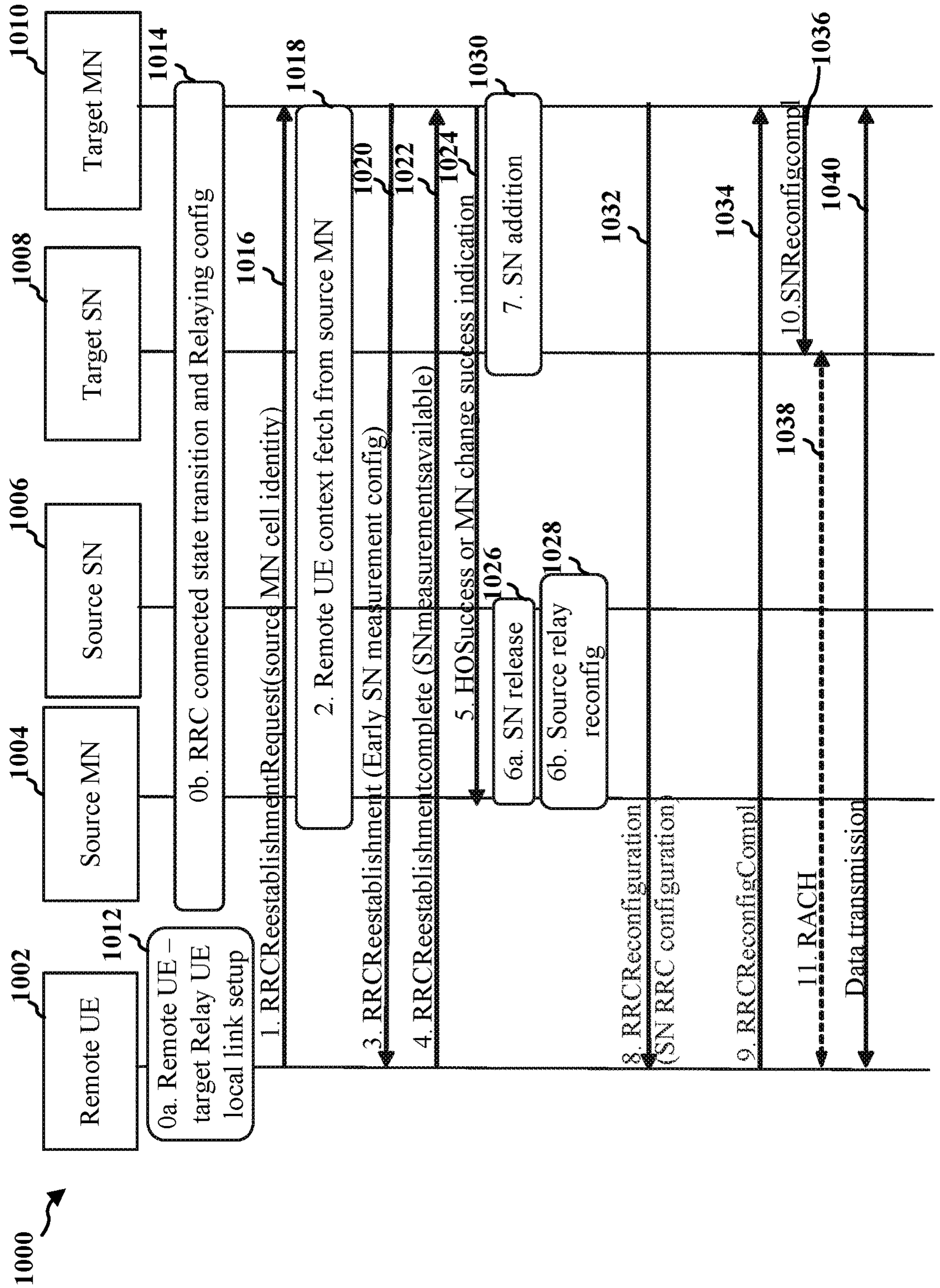
FIG. 10 is communication flow of a method of mobility management with dual connectivity.

FIG. 10 is communication flow 1000 of a method of mobility management with dual connectivity. The remote UE 1002 may be connected to the MN over a relayed link via a relay UE (not shown), and may be connected to the SN over either a direct Uu link or a relayed link. An RRC Reestablishment based MN change from the source MN 1004 to the target MN 1010 may be performed. An SN change from the source SN 1006 to the target SN 1008 may also be performed. At 1012, the remote UE 1002 may set up a local link with the target relay UE to initiate the MN change. The remote UE 1002 may select the suitable target relay UE, and may set up the local link with the selected target relay UE. The remote UE 1002 may release the source MN and the source SN connections prior to the target link setup. At 1014, the target relay UE may transition into the RRC_CONNECTED state, and the target MN 1010 may configure the target relay UE with the relaying configuration. At 1016, the remote UE 1002 may transmit a reestablishment request message to the target MN 1010 in an RRC message. The reestablishment request message may be an RRC Reestablishment Request message, and may include at least one of the identity of the remote UE 1002 associated with the source MN 1004 or the identity of the cell associated with the source MN 1004. At 1018, the target MN 1010 may retrieve the context of the remote UE 1002 from the source MN 1004 based on the identity of the cell associated with the source MN 1004 received at 1016. At 1020, the target MN 1010 may transmit an RRC Reestablishment message to the remote UE 1002. The RRC Reestablishment message may include the early SN measurement configuration. At 1022, the remote UE 1002 may transmit an RRC Reestablishment Complete message to the target MN 1010. The RRC Reestablishment Complete message may include the available SN measurements based on the SN measurement configuration to speed up the SN addition operation. At 1024, the target MN 1010 may transmit an indication of handover success or MN change success to the source MN 1004. At 1026, based on the change from the source SN 1006 to the target SN 1008, the source MN 1004 may perform an SN release operation with the source SN 1006, and the source SN 1006 may release its resources. At 1028, the source MN 1004 or the source SN 1006 may reconfigure the source relay UE based on the pending change from the source MN 1004 to the target MN 1010. At 1030, the target MN 1010 may perform an SN addition operation with the target SN 1008. At 1032, the target MN 1010 may transmit a reconfiguration message (e.g., an SN RRC configuration) to the remote UE 1002 in an RRC message. The RRC message may be an RRC Reconfiguration message. At 1034, the remote UE 1002 may transmit an indication of reconfiguration completion (e.g., an RRC reconfiguration complete) to the target MN 1010 in an RRC message. The RRC message may be an RRC Reconfiguration Complete message. At 1036, the target MN 1010 may transmit to the target SN 1008 an indication of SN reconfiguration completion. At 1038, the remote UE 1002 may establish a Uu link with the target SN 1008 by performing a RACH procedure. At 1038, the remote UE 1002 may communicate with the target MN 1010 over a relayed link via a relay UE and with the target SN 1008 via either a direct Uu link or a relayed link.

Figure 11:
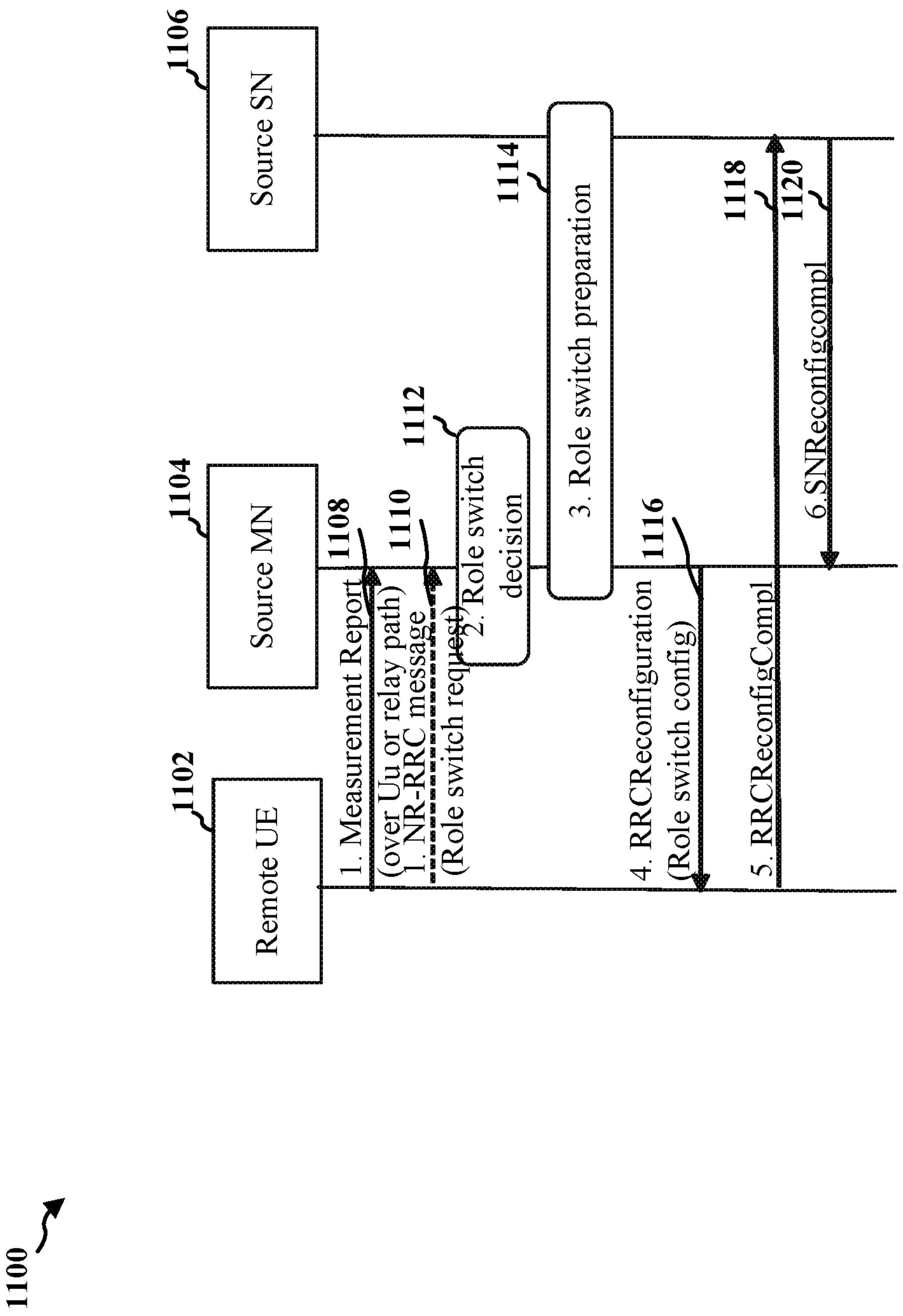
FIG. 11 is communication flow a method of switching roles between an MN and an SN.

FIG. 11 is communication flow 1100 a method of switching roles between an MN and an SN. An MN or SN change procedure may not be performed. At 1108, the remote UE 1102 may transmit a measurement report for the MN and SN links to the source MN 1104. The remote UE 1102 may transmit the measurement report over either a direct Uu link or a relay path. At 1110, the remote UE 1102 may transmit an RRC message to the source MN 1104. The RRC message may include a role switch request. In other configurations, the remote UE 1102 may transmit the role switch request in a sidelinkUEInformationNR message or a non-3GPPConnectionInformation message. At 1112, the source MN 1104 may make a role switch decision. At 1114, the source MN 1104 may perform a role switch preparation operation with the source SN 1106. At 1116, the source MN 1104 may transmit a reconfiguration message to the remote UE 1102 in an RRC message. The reconfiguration message may be an RRC Reconfiguration message, and may include the role switch configuration. At 1118, the source SN 1106 may transmit to the remote UE 1102 an indication of reconfiguration completion (e.g., an RRC reconfiguration complete). At 1120, the source SN 1106 may transmit to the source MN 1104 an indication of SN reconfiguration completion. Accordingly, based on the role switch, the source MN 1104 has become the SN for the remote UE 1102, and the source SN 1106 has become the MN for the remote UE 1102. At the same time, the relay connections may not be affected.

In one configuration, similar to the scenarios in NR-DC, either the MN or the SN may initiate SN modification, SN change, or SN release procedures.

In one configuration, the remote UE may release or modify the secondary connection (either a relayed connection or a direct Uu connection) based on the network requested configuration.

In one configuration, if the SN connection is a relayed connection and the SN change is due to a network initiated change, the MN may provide the target relay UE information for the SN change procedure. The remote UE may release the old relay connection and set up the relay connection via the target relay UE. Setting up the relay connection may include setting up the local link with the target relay UE.

In one configuration, if the SN connection is a relayed connection and the SN change is due to a remote UE initiated change, the remote UE may indicate the request for the SN change via an RRC message (or a sidelinkUEInformationNR message, or a non-3GPPConnectionInformation message). The SN may follow the SN change procedure (including the target relay UE information). The remote UE may release the old relay connection and set up the relay connection via the target relay UE. Setting up the relay connection may include setting up the local link with the target relay UE upon receiving the SN change indication from the network.

In one configuration, with dual connectivity, upon detecting Uu radio link failure (RLF) (for the direct Uu link) or PC5/non-3GPP RAT RLF (for the relayed link), the remote UE may not initiate the RRC reestablishment procedure, but may transmit a failure indication to the network via the non-RLF (i.e., working) path (either the PC5/non-3GPP RAT link or the direct Uu link). In one configuration, the transmission of the failure indication may be associated with a timer. The failure information may include available Uu measurements, available PC5/non-3GPP RAT measurements on the serving relay path (e.g., the sidelink discovery (SD)—reference signal received power (RSRP) (SD-RSRP)), and/or the failure cause. For MCG RLF, either the split signaling radio bearer (SRB) 1 (SRB1) or the SRB3 (if available) may be used to transmit the failure indication. For SCG RLF, the SRB1 may be used to transmit the failure indication. Upon receiving the failure indication, the network may perform one of an inter-MN change (from a source MN to a target MN) in case an MCG failure indication is received, or an inter-SN change (from a source SN to a target SN) in case an SCG failure indication is received. The network may also provide the target relay UE information when a relay path is present in the target connection. In one configuration, if the RLF persists when the timer expires, or if simultaneous Uu RLF and PC5/non-3GPP RLF are detected, the remote UE may perform the RRC reestablishment procedure.

Figure 12:
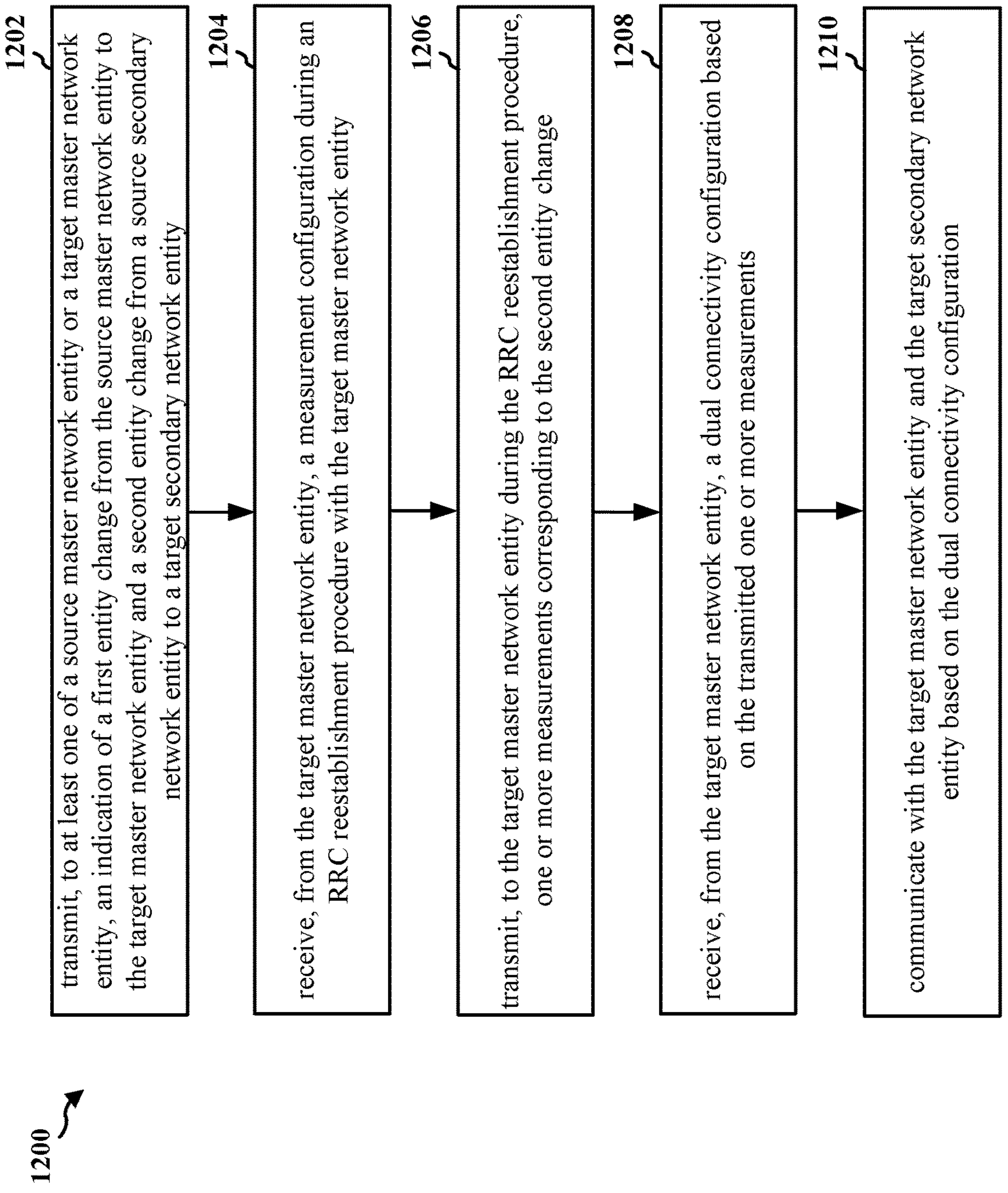
FIG. 12 is a flowchart of a method of wireless communication.

FIG. 12 is a flowchart 1200 of a method of wireless communication. The method may be performed by a remote UE (e.g., the UE 104/350; the remote UE 1002; the apparatus 1602). At 1202, the remote UE may transmit, to at least one of a source master network entity or a target master network entity, an indication of a first entity change from the source master network entity to the target master network entity and a second entity change from a source secondary network entity to a target secondary network entity. The remote UE may be connected to the source master network entity through a first relayed link via a first relay UE before the first entity change. For example, 1202 may be performed by the dual connectivity mobility component 1640 in FIG. 16. Referring to FIG. 10, at 1016, the remote UE 1002 may transmit, to at least one of a source master network entity 1004 or a target master network entity 1010, an indication of a first entity change from the source master network entity 1004 to the target master network entity 1010 and a second entity change from a source secondary network entity 1006 to a target secondary network entity 1008.

At 1204, the remote UE may receive, from the target master network entity, a measurement configuration during an RRC reestablishment procedure with the target master network entity. For example, 1204 may be performed by the dual connectivity mobility component 1640 in FIG. 16. Referring to FIG. 10, at 1020, the remote UE 1002 may receive, from the target master network entity 1010, a measurement configuration during an RRC reestablishment procedure with the target master network entity 1010.

At 1206, the remote UE may transmit, to the target master network entity during the RRC reestablishment procedure, one or more measurements corresponding to the second entity change. For example, 1206 may be performed by the dual connectivity mobility component 1640 in FIG. 16. Referring to FIG. 10, at 1022, the remote UE 1002 may transmit, to the target master network entity 1010 during the RRC reestablishment procedure, one or more measurements corresponding to the second entity change.

At 1208, the remote UE may receive, from the target master network entity, a dual connectivity configuration based on the transmitted one or more measurements. The dual connectivity configuration may correspond to the first entity change and the second entity change. The remote UE may be connected to the target master network entity through a second relayed link via a second relay UE after the first entity change. For example, 1208 may be performed by the dual connectivity mobility component 1640 in FIG. 16. Referring to FIG. 10, at 1032, the remote UE 1002 may receive, from the target master network entity 1010, a dual connectivity configuration based on the transmitted one or more measurements or the indication of the first entity change and the second entity change.

At 1210, the remote UE may communicate with the target master network entity and the target secondary network entity based on the dual connectivity configuration. For example, 1210 may be performed by the dual connectivity mobility component 1640 in FIG. 16. Referring to FIG. 10, at 1040, the remote UE 1002 may communicate with the target master network entity 1010 and the target secondary network entity 1008 based on the dual connectivity configuration.

Figure 13:
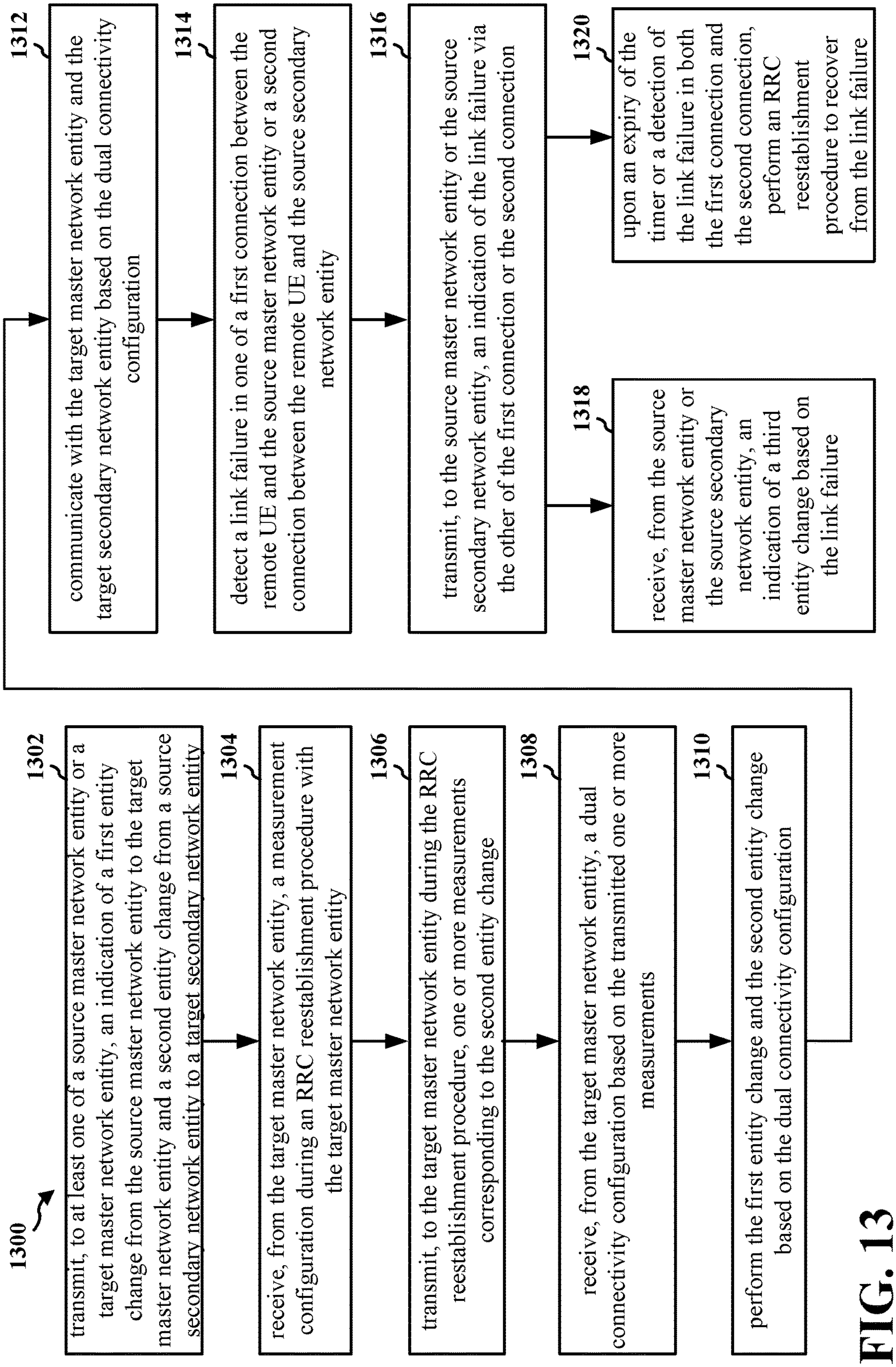
FIG. 13 is a flowchart of a method of wireless communication.

FIG. 13 is a flowchart 1300 of a method of wireless communication. The method may be performed by a remote UE (e.g., the UE 104/350; the remote UE 1002; the apparatus 1602). At 1302, the remote UE may transmit, to at least one of a source master network entity or a target master network entity, an indication of a first entity change from the source master network entity to the target master network entity and a second entity change from a source secondary network entity to a target secondary network entity. The remote UE may be connected to the source master network entity through a first relayed link via a first relay UE before the first entity change. For example, 1302 may be performed by the dual connectivity mobility component 1640 in FIG. 16. Referring to FIG. 10, at 1016, the remote UE 1002 may transmit, to at least one of a source master network entity 1004 or a target master network entity 1010, an indication of a first entity change from the source master network entity 1004 to the target master network entity 1010 and a second entity change from a source secondary network entity 1006 to a target secondary network entity 1008.

At 1304, the remote UE may receive, from the target master network entity, a measurement configuration during an RRC reestablishment procedure with the target master network entity. For example, 1304 may be performed by the dual connectivity mobility component 1640 in FIG. 16. Referring to FIG. 10, at 1020, the remote UE 1002 may receive, from the target master network entity 1010, a measurement configuration during an RRC reestablishment procedure with the target master network entity 1010.

At 1306, the remote UE may transmit, to the target master network entity during the RRC reestablishment procedure, one or more measurements corresponding to the second entity change. For example, 1306 may be performed by the dual connectivity mobility component 1640 in FIG. 16. Referring to FIG. 10, at 1022, the remote UE 1002 may transmit, to the target master network entity 1010 during the RRC reestablishment procedure, one or more measurements corresponding to the second entity change.

At 1308, the remote UE may receive, from the target master network entity, a dual connectivity configuration based on the transmitted one or more measurements. The dual connectivity configuration may correspond to the first entity change and the second entity change. The remote UE may be connected to the target master network entity through a second relayed link via a second relay UE after the first entity change. For example, 1308 may be performed by the dual connectivity mobility component 1640 in FIG. 16. Referring to FIG. 10, at 1032, the remote UE 1002 may receive, from the target master network entity 1010, a dual connectivity configuration based on the transmitted one or more measurements or the indication of the first entity change and the second entity change.

At 1312, the remote UE may communicate with the target master network entity and the target secondary network entity based on the dual connectivity configuration. For example, 1312 may be performed by the dual connectivity mobility component 1640 in FIG. 16. Referring to FIG. 10, at 1040, the remote UE 1002 may communicate with the target master network entity 1010 and the target secondary network entity 1008 based on the dual connectivity configuration.

At 1310, the remote UE may perform the first entity change and the second entity change based on the dual connectivity configuration. For example, 1310 may be performed by the dual connectivity mobility component 1640 in FIG. 16.

In one configuration, the indication of the first entity change and the second entity change may be transmitted via an RRC reestablishment procedure with the target master network entity.

In one configuration, the RRC reestablishment request message may include at least one of an identifier of the remote UE associated with the source master network entity or an identifier of the source master network entity, and context information associated with the remote UE may be forwarded from the source master network entity to the target master network entity based on the at least one of the identifier of the remote UE associated with the source master network entity or the identifier of the source master network entity.

In one configuration, the first relayed link may include a first local link between the remote UE and the first relay UE, the second relayed link may include a second local link between the remote UE and the second relay UE, and the first local link or the second local link may include one of a sidelink, a peer-to-peer communication link, a device-to-device communication link, a Bluetooth link, or a Wi-Fi link.

In one configuration, at 1314, the remote UE may detect a link failure in one of a first connection between the remote UE and the source master network entity or a second connection between the remote UE and the source secondary network entity. For example, 1314 may be performed by the dual connectivity mobility component 1640 in FIG. 16. At 1316, the remote UE may transmit, to the source master network entity or the source secondary network entity, an indication of the link failure via the other of the first connection or the second connection. For example, 1316 may be performed by the dual connectivity mobility component 1640 in FIG. 16.

In one configuration, at 1318, the remote UE may receive, from the source master network entity or the source secondary network entity, an indication of a third entity change based on the link failure. For example, 1318 may be performed by the dual connectivity mobility component 1640 in FIG. 16.

In one configuration, the transmission of the indication of the link failure may be associated with a timer, and at 1320, the remote UE may perform an RRC reestablishment procedure to recover from the link failure upon an expiry of the timer or a detection of the link failure in both the first connection and the second connection. For example, 1320 may be performed by the dual connectivity mobility component 1640 in FIG. 16.

Figure 14:
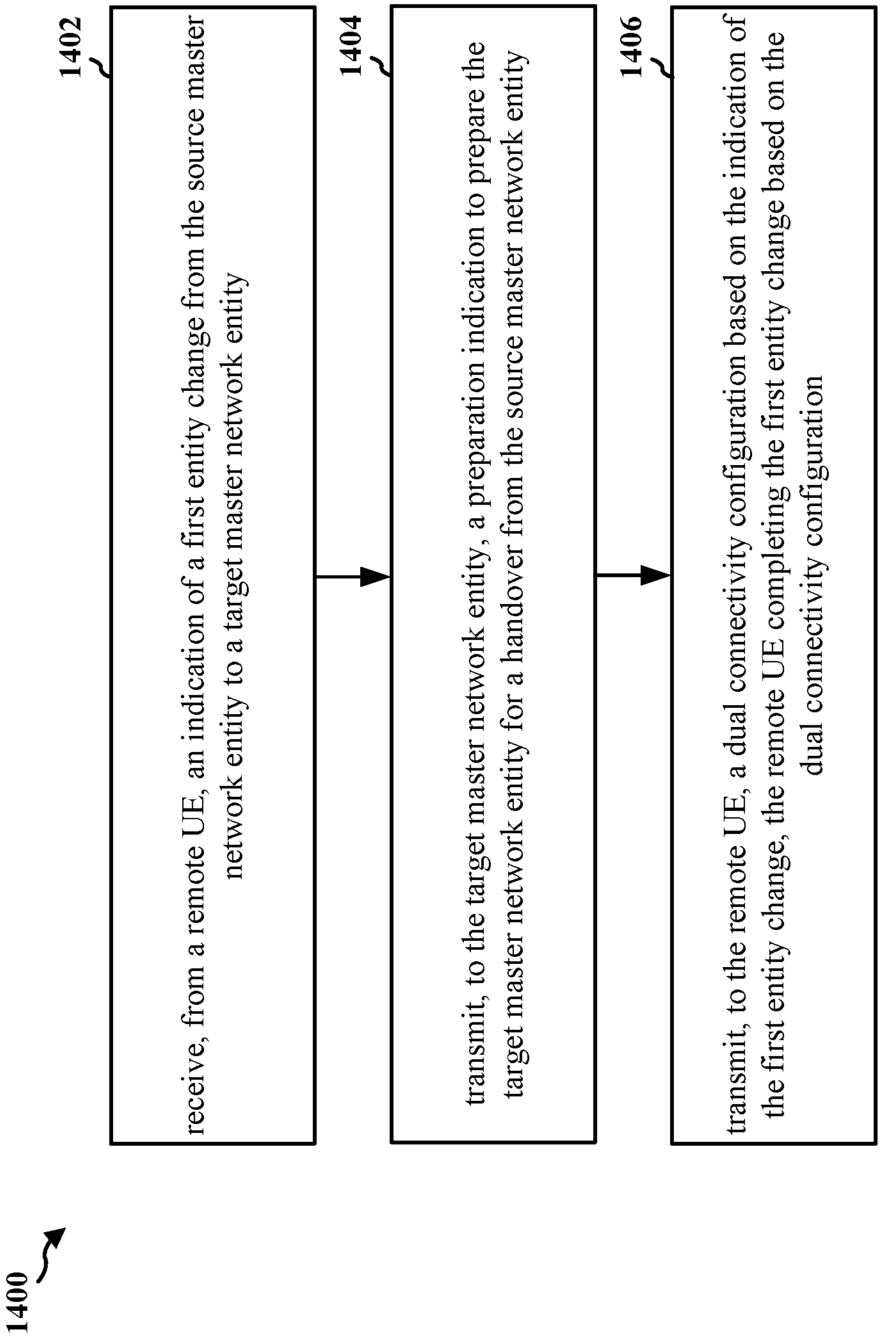
FIG. 14 is a flowchart of a method of wireless communication.

FIG. 14 is a flowchart 1400 of a method of wireless communication. The method may be performed by a base station/source master network entity (e.g., the base station 102/180/310; the source MN 804/904; the apparatus 1702). At 1402, the source master network entity may receive, from a remote UE, an indication of a first entity change from the source master network entity to a target master network entity. For example, 1402 may be performed by the dual connectivity mobility component 1740 in FIG. 17. Referring to FIGS. 8 and 9, at 812/912, the source master network entity 804/904 may receive, from a remote UE 802/902, an indication of a first entity change from the source master network entity 804/904 to a target master network entity 810/910.

At 1404, the source master network entity may transmit, to the target master network entity, a preparation indication to prepare the target master network entity for a handover from the source master network entity. For example, 1404 may be performed by the dual connectivity mobility component 1740 in FIG. 17. Referring to FIGS. 8 and 9, at 816/916 and 820/920, the source master network entity 804/904 may transmit, to the target master network entity 810/910, a preparation indication to prepare the target master network entity 810/910 for a handover from the source master network entity 804/904.

At 1406, the source master network entity may transmit, to the remote UE, a dual connectivity configuration based on the indication of the first entity change. The remote UE may complete the first entity change based on the dual connectivity configuration. For example, 1406 may be performed by the dual connectivity mobility component 1740 in FIG. 17. Referring to FIGS. 8 and 9, at 826/926, the source master network entity 804/904 may transmit, to the remote UE 802/902, a dual connectivity configuration based on the indication of the first entity change.

Figure 15:
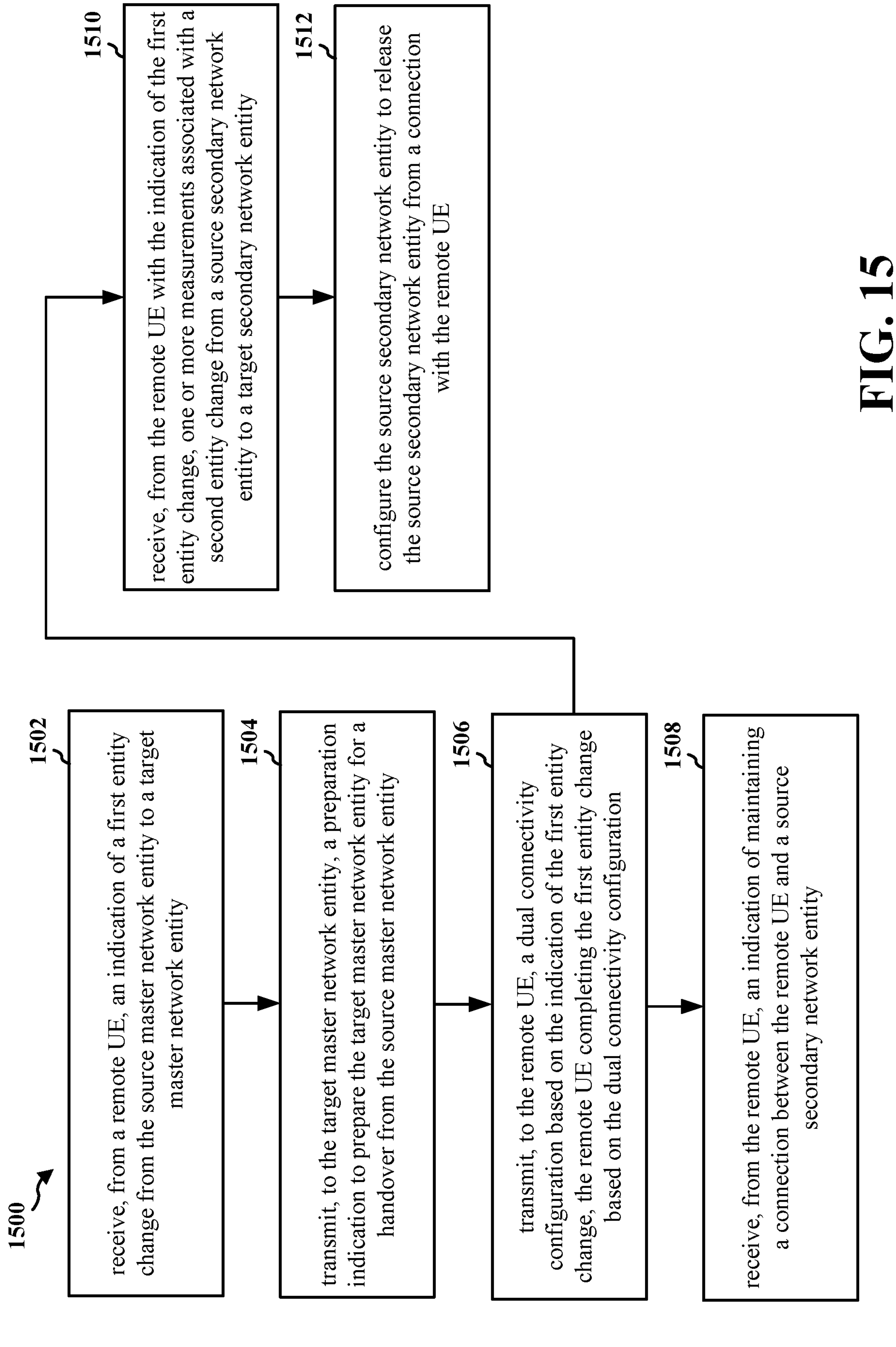
FIG. 15 is a flowchart of a method of wireless communication.

FIG. 15 is a flowchart 1500 of a method of wireless communication. The method may be performed by a base station/source master network entity (e.g., the base station 102/180/310; the source MN 804/904; the apparatus 1702). At 1502, the source master network entity may receive, from a remote UE, an indication of a first entity change from the source master network entity to a target master network entity. For example, 1502 may be performed by the dual connectivity mobility component 1740 in FIG. 17. Referring to FIGS. 8 and 9, at 812/912, the source master network entity 804/904 may receive, from a remote UE 802/902, an indication of a first entity change from the source master network entity 804/904 to a target master network entity 810/910.

At 1504, the source master network entity may transmit, to the target master network entity, a preparation indication to prepare the target master network entity for a handover from the source master network entity. For example, 1504 may be performed by the dual connectivity mobility component 1740 in FIG. 17. Referring to FIGS. 8 and 9, at 816/916 and 820/920, the source master network entity 804/904 may transmit, to the target master network entity 810/910, a preparation indication to prepare the target master network entity 810/910 for a handover from the source master network entity 804/904.

At 1506, the source master network entity may transmit, to the remote UE, a dual connectivity configuration based on the indication of the first entity change. The remote UE may complete the first entity change based on the dual connectivity configuration. For example, 1506 may be performed by the dual connectivity mobility component 1740 in FIG. 17. Referring to FIGS. 8 and 9, at 826/926, the source master network entity 804/904 may transmit, to the remote UE 802/902, a dual connectivity configuration based on the indication of the first entity change.

In one configuration, the source master network entity may be connected to the remote UE via a direct connection.

In one configuration, the indication of the first entity change may include one or more measurements.

In one configuration, the source master network entity may be connected to the remote UE via a relayed connection.

In one configuration, the indication of the first entity change may be received in an RRC message.

In one configuration, the dual connectivity configuration may be transmitted to the remote UE in an RRC reconfiguration message.

In one configuration, at 1508, the source master network entity may receive, from the remote UE, an indication of maintaining a connection between the remote UE and a source secondary network entity. For example, 1508 may be performed by the dual connectivity mobility component 1740 in FIG. 17. Referring to FIGS. 8 and 9, at 812/912, the source master network entity 804/904 may receive, from the remote UE 802/902, an indication of maintaining a connection between the remote UE 802/902 and a source secondary network entity 806/906.

In one configuration, the connection between the remote UE and the source secondary network entity may include a relayed link via a relay UE, and to transmit the preparation indication to prepare the target master network entity for the handover, the source master network entity may transmit at least an identifier of the source secondary network entity or information associated with the relay UE to the target master network entity.

In one configuration, at 1510, the source master network entity may receive, from the remote UE with the indication of the first entity change, one or more measurements associated with a second entity change from a source secondary network entity to a target secondary network entity. For example, 1510 may be performed by the dual connectivity mobility component 1740 in FIG. 17. Referring to FIGS. 8 and 9, at 812/912, the source master network entity 804/904 may receive, from the remote UE 802/902 with the indication of the first entity change, one or more measurements associated with a second entity change from a source secondary network entity 806/906 to a target secondary network entity 808/908.

In one configuration, at 1512, the source master network entity may configure the source secondary network entity to release the source secondary network entity from a connection with the remote UE. For example, 1512 may be performed by the dual connectivity mobility component 1740 in FIG. 17. Referring to FIGS. 8 and 9, at 822/922, the source master network entity 804/904 may configure the source secondary network entity 806/906 to release the source secondary network entity 806/906 from a connection with the remote UE 802/902.

In one configuration, a connection between the remote UE and the source secondary network entity before the second entity change may be a first relayed link via a first relay UE, and to transmit the preparation indication to prepare the target master network entity for the handover, the source master network entity may transmit, to the target master network entity, at least an identifier of the source secondary network entity or information associated with the first relay UE.

In one configuration, the connection between the remote UE and the target secondary network entity after the second entity change may be a second relayed link via a second relay UE, and the dual connectivity configuration transmitted to the remote UE may include information associated with the second relay UE.

Figure 16:
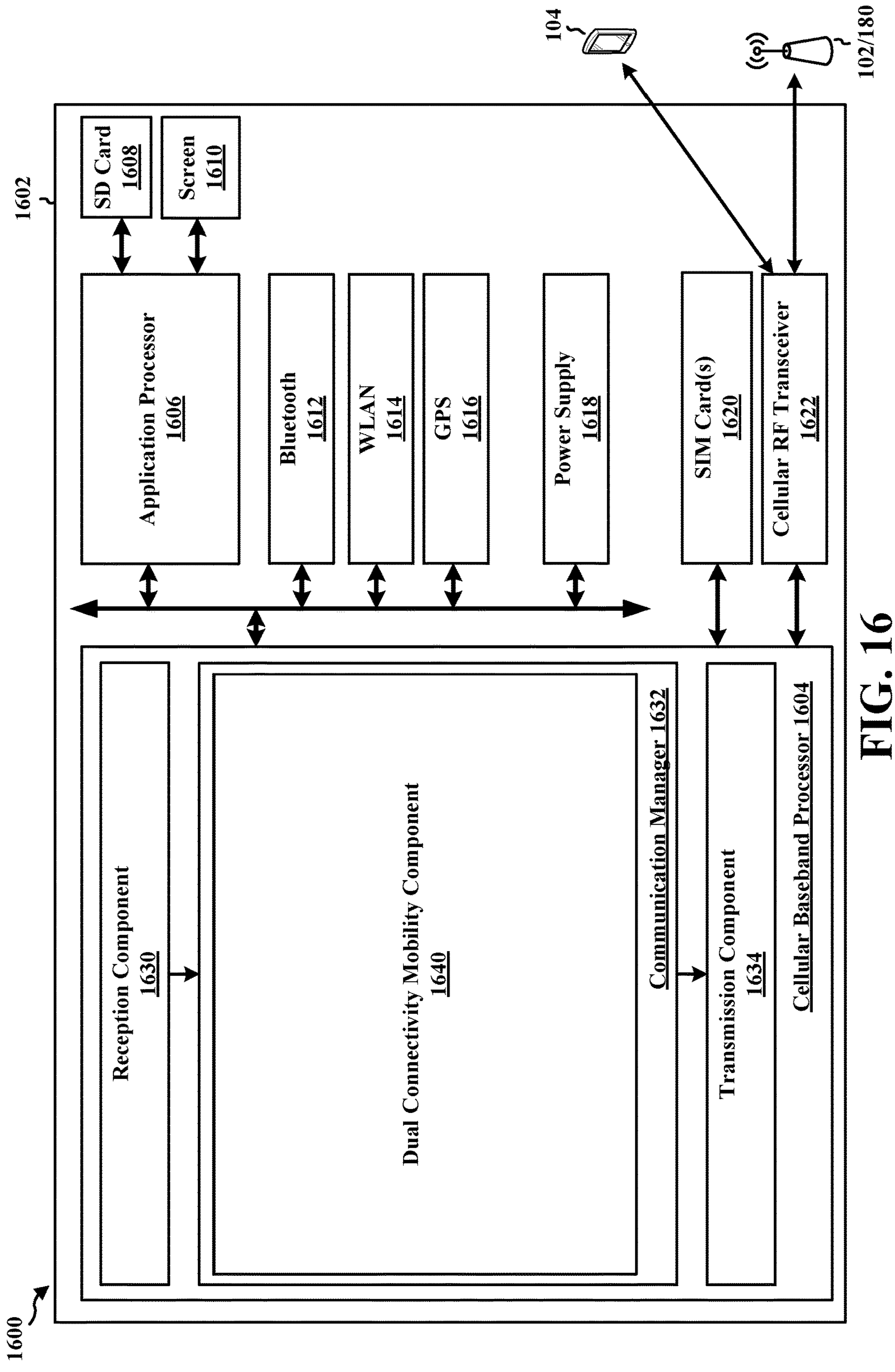
FIG. 16 is a diagram illustrating an example of a hardware implementation for an example apparatus.

FIG. 16 is a diagram 1600 illustrating an example of a hardware implementation for an apparatus 1602. The apparatus 1602 may be a UE, a component of a UE, or may implement UE functionality. In some aspects, the apparatus 1602 may include a cellular baseband processor 1604 (also referred to as a modem) coupled to a cellular RF transceiver 1622. In some aspects, the apparatus 1602 may further include one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, or a power supply 1618. The cellular baseband processor 1604 communicates through the cellular RF transceiver 1622 with the UE 104 and/or BS 102/180. The cellular baseband processor 1604 may include a computer-readable medium/memory. The computer-readable medium/memory may be non-transitory. The cellular baseband processor 1604 is responsible for general processing, including the execution of software stored on the computer-readable medium/memory. The software, when executed by the cellular baseband processor 1604, causes the cellular baseband processor 1604 to perform the various functions described supra. The computer-readable medium/memory may also be used for storing data that is manipulated by the cellular baseband processor 1604 when executing software. The cellular baseband processor 1604 further includes a reception component 1630, a communication manager 1632, and a transmission 1634. The communication manager 1632 includes the one or more illustrated components. The components within the communication manager 1632 may be stored in the computer-readable medium/memory and/or configured as hardware within the cellular baseband processor 1604. The cellular baseband processor 1604 may be a component of the UE 350 and may include the memory 360 and/or at least one of the TX processor 368, the RX processor 356, and the controller/processor 359. In one configuration, the apparatus 1602 may be a modem chip and include just the baseband processor 1604, and in another configuration, the apparatus 1602 may be the entire UE (e.g., see 350 of FIG. 3) and include the additional modules of the apparatus 1602.

The communication manager 1632 may include a dual connectivity mobility component 1640 that may be configured to transmit, to at least one of a source master network entity or a target master network entity, an indication of a first entity change from the source master network entity to the target master network entity and a second entity change from a source secondary network entity to a target secondary network entity, the remote UE being connected to the source master network entity through a first relayed link via a first relay UE before the first entity change, e.g., as described in connection with 1202 in FIGS. 12 and 1302 in FIG. 13. The dual connectivity mobility component 1640 may be configured to receive, from the target master network entity, a measurement configuration during an RRC reestablishment procedure with the target master network entity, e.g., as described in connection with 1204 in FIGS. 12 and 1304 in FIG. 13. The dual connectivity mobility component 1640 may be configured to transmit, to the target master network entity during the RRC reestablishment procedure, one or more measurements corresponding to the second entity change, e.g., as described in connection with 1206 in FIGS. 12 and 1306 in FIG. 13. The dual connectivity mobility component 1640 may be configured to receive, from the target master network entity, a dual connectivity configuration based on the transmitted one or more measurements, the dual connectivity configuration corresponding to the first entity change and the second entity change, the remote UE being connected to the target master network entity through a second relayed link via a second relay UE after the first entity change, e.g., as described in connection with 1208 in FIGS. 12 and 1308 in FIG. 13. The dual connectivity mobility component 1640 may be configured to perform the first entity change and the second entity change based on the dual connectivity configuration, e.g., as described in connection with 1310 in FIG. 13. The dual connectivity mobility component 1640 may be configured to communicate with the target master network entity and the target secondary network entity based on the dual connectivity configuration, e.g., as described in connection with 1210 in FIGS. 12 and 1312 in FIG. 13. The dual connectivity mobility component 1640 may be configured to detect a link failure in one of a first connection between the remote UE and the source master network entity or a second connection between the remote UE and the source secondary network entity, e.g., as described in connection with 1314 in FIG. 13. The dual connectivity mobility component 1640 may be configured to transmit, to the source master network entity or the source secondary network entity, an indication of the link failure via the other of the first connection or the second connection, e.g., as described in connection with 1316 in FIG. 13. The dual connectivity mobility component 1640 may be configured to receive, from the source master network entity or the source secondary network entity, an indication of a third entity change based on the link failure, e.g., as described in connection with 1318 in FIG. 13. The dual connectivity mobility component 1640 may be configured to upon an expiry of the timer or a detection of the link failure in both the first connection and the second connection, perform an RRC reestablishment procedure to recover from the link failure, e.g., as described in connection with 1320 in FIG. 13.

The apparatus may include additional components that perform each of the blocks of the algorithm in the flowcharts of FIGS. 8-13. As such, each block in the flowcharts of FIGS. 8-13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the cellular baseband processor 1604, includes means for transmitting, to at least one of a source master network entity or a target master network entity, an indication of a first entity change from the source master network entity to the target master network entity and a second entity change from a source secondary network entity to a target secondary network entity, the remote UE being connected to the source master network entity through a first relayed link via a first relay UE before the first entity change. The apparatus 1602 may include means for receiving, from the target master network entity, a measurement configuration during an RRC reestablishment procedure with the target master network entity. The apparatus 1602 may include means for transmitting, to the target master network entity during the RRC reestablishment procedure, one or more measurements corresponding to the second entity change. The apparatus 1602 may include means for receiving, from the target master network entity, a dual connectivity configuration based on the transmitted one or more measurements, the dual connectivity configuration corresponding to the first entity change and the second entity change, the remote UE being connected to the target master network entity through a second relayed link via a second relay UE after the first entity change. The apparatus 1602 may include means for communicating with the target master network entity and the target secondary network entity based on the dual connectivity configuration.

In one configuration, the indication of the first entity change and the second entity change may be transmitted via an RRC reestablishment procedure with the target master network entity. In one configuration, the RRC reestablishment request message may include at least one of an identifier of the remote UE associated with the source master network entity or an identifier of the source master network entity, and context information associated with the remote UE may be forwarded from the source master network entity to the target master network entity based on the at least one of the identifier of the remote UE associated with the source master network entity or the identifier of the source master network entity. In one configuration, the first relayed link may include a first local link between the remote UE and the first relay UE, the second relayed link may include a second local link between the remote UE and the second relay UE, and the first local link or the second local link may include one of a sidelink, a peer-to-peer communication link, a device-to-device communication link, a Bluetooth link, or a Wi-Fi link. In one configuration, the apparatus 1602 may include means for detecting a link failure in one of a first connection between the remote UE and the source master network entity or a second connection between the remote UE and the source secondary network entity. The apparatus 1602 may include means for transmitting, to the source master network entity or the source secondary network entity, an indication of the link failure via the other of the first connection or the second connection. In one configuration, the apparatus 1602 may include means for receiving, from the source master network entity or the source secondary network entity, an indication of a third entity change based on the link failure. In one configuration, the transmission of the indication of the link failure may be associated with a timer, and the apparatus 1602 may include means for performing an RRC reestablishment procedure to recover from the link failure upon an expiry of the timer or a detection of the link failure in both the first connection and the second connection.

The means may be one or more of the components of the apparatus 1602 configured to perform the functions recited by the means. As described supra, the apparatus 1602 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 17:
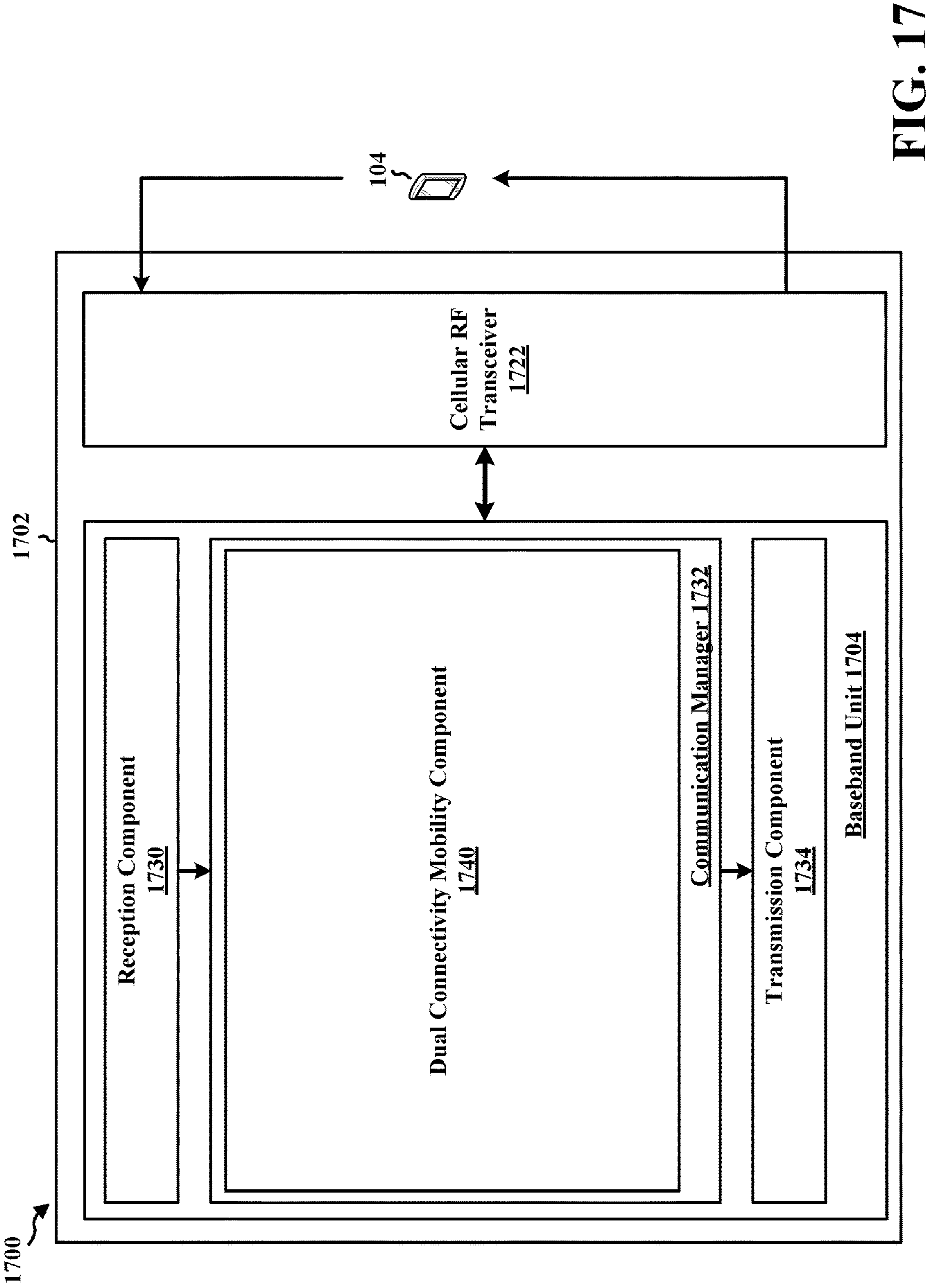
FIG. 17 is a diagram illustrating an example of a hardware implementation for an example apparatus.

FIG. 17 is a diagram 1700 illustrating an example of a hardware implementation for an apparatus 1702. The apparatus 1702 may be a base station, a component of a base station, or may implement base station functionality. In some aspects, the apparatus 1602 may include a baseband unit 1704. The baseband unit 1704 may communicate through a cellular RF transceiver 1722 with the UE 104. The baseband unit 1704 may include a computer-readable medium/memory. The baseband unit 1704 is responsible for general processing, including the execution of software stored on the computer-readable medium/memory. The software, when executed by the baseband unit 1704, causes the baseband unit 1704 to perform the various functions described supra. The computer-readable medium/memory may also be used for storing data that is manipulated by the baseband unit 1704 when executing software. The baseband unit 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband unit 1704. The baseband unit 1704 may be a component of the base station 310 and may include the memory 376 and/or at least one of the TX processor 316, the RX processor 370, and the controller/processor 375.

The communication manager 1732 may include a dual connectivity mobility component 1740 that may be configured to receive, from a remote UE, an indication of a first entity change from the source master network entity to a target master network entity, e.g., as described in connection with 1402 in FIGS. 14 and 1502 in FIG. 15. The dual connectivity mobility component 1740 may be configured to transmit, to the target master network entity, a preparation indication to prepare the target master network entity for a handover from the source master network entity, e.g., as described in connection with 1404 in FIGS. 14 and 1504 in FIG. 15. The dual connectivity mobility component 1740 may be configured to transmit, to the remote UE, a dual connectivity configuration based on the indication of the first entity change, the remote UE completing the first entity change based on the dual connectivity configuration, e.g., as described in connection with 1406 in FIGS. 14 and 1506 in FIG. 15. The dual connectivity mobility component 1740 may be configured to receive, from the remote UE, an indication of maintaining a connection between the remote UE and a source secondary network entity, e.g., as described in connection with 1508 in FIG. 15. The dual connectivity mobility component 1740 may be configured to receive, from the remote UE with the indication of the first entity change, one or more measurements associated with a second entity change from a source secondary network entity to a target secondary network entity, e.g., as described in connection with 1510 in FIG. 15. The dual connectivity mobility component 1740 may be configured to configure the source secondary network entity to release the source secondary network entity from a connection with the remote UE, e.g., as described in connection with 1512 in FIG. 15.

The apparatus may include additional components that perform each of the blocks of the algorithm in the flowcharts of FIGS. 8-11, 14, and 15. As such, each block in the flowcharts of FIGS. 8-11, 14, and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1702 may include a variety of components configured for various functions. In one configuration, the apparatus 1702, and in particular the baseband unit 1704, includes means for receiving, from a remote UE, an indication of a first entity change from the source master network entity to a target master network entity. The apparatus 1702 may include means for transmitting, to the target master network entity, a preparation indication to prepare the target master network entity for a handover from the source master network entity. The apparatus 1702 may include means for transmitting, to the remote UE, a dual connectivity configuration based on the indication of the first entity change, the remote UE completing the first entity change based on the dual connectivity configuration.

In one configuration, the source master network entity may be connected to the remote UE via a direct connection. In one configuration, the indication of the first entity change may include one or more measurements. In one configuration, the source master network entity may be connected to the remote UE via a relayed connection. In one configuration, the indication of the first entity change may be received in an RRC message. In one configuration, the dual connectivity configuration may be transmitted to the remote UE in an RRC reconfiguration message. In one configuration, the apparatus 1702 may include means for receiving, from the remote UE, an indication of maintaining a connection between the remote UE and a source secondary network entity. In one configuration, the connection between the remote UE and the source secondary network entity may include a relayed link via a relay UE, and to transmit the preparation indication to prepare the target master network entity for the handover, the apparatus 1702 may include means for transmitting at least an identifier of the source secondary network entity or information associated with the relay UE to the target master network entity. In one configuration, the apparatus 1702 may include means for receiving, from the remote UE with the indication of the first entity change, one or more measurements associated with a second entity change from a source secondary network entity to a target secondary network entity. In one configuration, the apparatus 1702 may include means for configuring the source secondary network entity to release the source secondary network entity from a connection with the remote UE. In one configuration, a connection between the remote UE and the source secondary network entity before the second entity change may be a first relayed link via a first relay UE, and to transmit the preparation indication to prepare the target master network entity for the handover, the apparatus 1702 may include means for transmitting, to the target master network entity, at least an identifier of the source secondary network entity or information associated with the first relay UE. In one configuration, the connection between the remote UE and the target secondary network entity after the second entity change may be a second relayed link via a second relay UE, and the dual connectivity configuration transmitted to the remote UE may include information associated with the second relay UE.

The means may be one or more of the components of the apparatus 1702 configured to perform the functions recited by the means. As described supra, the apparatus 1702 may include the TX Processor 316, the RX Processor 370, and the controller/processor 375. As such, in one configuration, the means may be the TX Processor 316, the RX Processor 370, and the controller/processor 375 configured to perform the functions recited by the means.

Aspects described herein may relate to mobility management in the context of dual connectivity and the L2 UE-to-network relay. A remote UE may transmit, to at least one of a source master network entity or a target master network entity, an indication of a first entity change from the source master network entity to the target master network entity and a second entity change from a source secondary network entity to a target secondary network entity. The remote UE may be connected to the source master network entity through a first relayed link via a first relay UE before the first entity change. The remote UE may receive, from the target master network entity, a measurement configuration during an RRC reestablishment procedure with the target master network entity. The remote UE may transmit, to the target master network entity during the RRC reestablishment procedure, one or more measurements corresponding to the second entity change. The remote UE may receive, from the target master network entity, a dual connectivity configuration based on the transmitted one or more measurements. The dual connectivity configuration may correspond to the first entity change and the second entity change. The remote UE may be connected to the target master network entity through a second relayed link via a second relay UE after the first entity change. The remote UE may communicate with the target master network entity and the target secondary network entity based on the dual connectivity configuration.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a remote UE including at least one processor coupled to a memory and configured to transmit, to at least one of a source master network entity or a target master network entity, an indication of a first entity change from the source master network entity to the target master network entity and a second entity change from a source secondary network entity to a target secondary network entity, the remote UE being connected to the source master network entity through a first relayed link via a first relay UE before the first entity change; receive, from the target master network entity, a measurement configuration during an RRC reestablishment procedure with the target master network entity; transmit, to the target master network entity during the RRC reestablishment procedure, one or more measurements corresponding to the second entity change; receive, from the target master network entity, a dual connectivity configuration based on the transmitted one or more measurements, the dual connectivity configuration corresponding to the first entity change and the second entity change, the remote UE being connected to the target master network entity through a second relayed link via a second relay UE after the first entity change; and communicate with the target master network entity and the target secondary network entity based on the dual connectivity configuration.

Aspect 2 is the apparatus of aspect 1, the at least one processor being further configured to: perform the first entity change and the second entity change based on the dual connectivity configuration.

Aspect 3 is the apparatus of any of aspects 1 and 2, where the indication of the first entity change and the second entity change is transmitted via an RRC reestablishment procedure with the target master network entity.

Aspect 4 is the apparatus of aspect 3, where the RRC reestablishment request message includes at least one of an identifier of the remote UE associated with the source master network entity or an identifier of the source master network entity, and context information associated with the remote UE is forwarded from the source master network entity to the target master network entity based on the at least one of the identifier of the remote UE associated with the source master network entity or the identifier of the source master network entity.

Aspect 5 is the apparatus of any of aspects 1 to 4, where the first relayed link includes a first local link between the remote UE and the first relay UE, the second relayed link includes a second local link between the remote UE and the second relay UE, and the first local link or the second local link includes one of a sidelink, a peer-to-peer communication link, a device-to-device communication link, a Bluetooth link, or a Wi-Fi link.

Aspect 6 is the apparatus of any of aspects 1 to 5, the at least one processor being further configured to: detect a link failure in one of a first connection between the remote UE and the source master network entity or a second connection between the remote UE and the source secondary network entity; and transmit, to the source master network entity or the source secondary network entity, an indication of the link failure via the other of the first connection or the second connection.

Aspect 7 is the apparatus of aspect 6, the at least one processor being further configured to: receive, from the source master network entity or the source secondary network entity, an indication of a third entity change based on the link failure.

Aspect 8 is the apparatus of aspect 6, where the transmission of the indication of the link failure is associated with a timer, and upon an expiry of the timer or a detection of the link failure in both the first connection and the second connection, the at least one processor is further configured to perform an RRC reestablishment procedure to recover from the link failure.

Aspect 9 is the apparatus of any of aspects 1 to 8, further including a transceiver coupled to the at least one processor.

Aspect 10 is an apparatus for wireless communication at a source master network entity including at least one processor coupled to a memory and configured to receive, from a remote UE, an indication of a first entity change from the source master network entity to a target master network entity; transmit, to the target master network entity, a preparation indication to prepare the target master network entity for a handover from the source master network entity; and transmit, to the remote UE, a dual connectivity configuration based on the indication of the first entity change, the remote UE completing the first entity change based on the dual connectivity configuration.

Aspect 11 is the apparatus of aspect 10, where the source master network entity is connected to the remote UE via a direct connection.

Aspect 12 is the apparatus of aspect 11, where the indication of the first entity change includes one or more measurements.

Aspect 13 is the apparatus of aspect 10, where the source master network entity is connected to the remote UE via a relayed connection.

Aspect 14 is the apparatus of aspect 13, where the indication of the first entity change is received in an RRC message.

Aspect 15 is the apparatus of any of aspects 10 to 14, where the dual connectivity configuration is transmitted to the remote UE in an RRC reconfiguration message.

Aspect 16 is the apparatus of any of aspects 10 to 15, the at least one processor being further configured to: receive, from the remote UE, an indication of maintaining a connection between the remote UE and a source secondary network entity.

Aspect 17 is the apparatus of aspect 16, where the connection between the remote UE and the source secondary network entity includes a relayed link via a relay UE, and to transmit the preparation indication to prepare the target master network entity for the handover, the at least one processor is further configured to transmit at least an identifier of the source secondary network entity or information associated with the relay UE to the target master network entity.

Aspect 18 is the apparatus of any of aspects 10 to 15, the at least one processor being further configured to: receive, from the remote UE with the indication of the first entity change, one or more measurements associated with a second entity change from a source secondary network entity to a target secondary network entity.

Aspect 19 is the apparatus of aspect 18, the at least one processor being further configured to: configure the source secondary network entity to release the source secondary network entity from a connection with the remote UE.

Aspect 20 is the apparatus of any of aspects 18 and 19, where a connection between the remote UE and the source secondary network entity before the second entity change is a first relayed link via a first relay UE, and to transmit the preparation indication to prepare the target master network entity for the handover, the at least one processor is further configured to transmit, to the target master network entity, at least an identifier of the source secondary network entity or information associated with the first relay UE.

Aspect 21 is the apparatus of aspect 20, where the connection between the remote UE and the target secondary network entity after the second entity change is a second relayed link via a second relay UE, and the dual connectivity configuration transmitted to the remote UE includes information associated with the second relay UE.

Aspect 22 is the apparatus of any of aspects 10 to 21, further including a transceiver coupled to the at least one processor.

Aspect 23 is a method of wireless communication for implementing any of aspects 1 to 22.

Aspect 24 is an apparatus for wireless communication including means for implementing any of aspects 1 to 22.

Aspect 25 is a computer-readable medium storing computer executable code, where the code when executed by a processor causes the processor to implement any of aspects 1 to 22.

What is claimed is:

1. An apparatus for wireless communication at a remote user equipment (UE), comprising:

a memory; and at least one processor coupled to the memory and configured to:

transmit, to at least one of a source master network entity or a target master network entity, an indication of a first entity change from the source master network entity to the target master network entity and a second entity change from a source secondary network entity to a target secondary network entity, the remote UE being connected to the source master network entity through a first relayed link via a first relay UE before the first entity change;

receive, from the target master network entity, a measurement configuration during a radio resource control (RRC) reestablishment procedure with the target master network entity;

transmit, to the target master network entity during the RRC reestablishment procedure, one or more measurements corresponding to the second entity change;

receive, from the target master network entity, a dual connectivity configuration based on the transmitted one or more measurements, the dual connectivity configuration corresponding to the first entity change and the second entity change, the remote UE being connected to the target master network entity through a second relayed link via a second relay UE after the first entity change; and communicate with the target master network entity and the target secondary network entity based on the dual connectivity configuration.

2. The apparatus of claim 1, the at least one processor being further configured to:

perform the first entity change and the second entity change based on the dual connectivity configuration.

3. The apparatus of claim 1, wherein the indication of the first entity change and the second entity change is transmitted via an RRC reestablishment procedure with the target master network entity.

4. The apparatus of claim 3, wherein a RRC reestablishment request message of the RRC reestablishment procedure comprises at least one of an identifier of the remote UE associated with the source master network entity or an identifier of the source master network entity, and context information associated with the remote UE is forwarded from the source master network entity to the target master network entity based on at least the identifier of the remote UE associated with the source master network entity or the identifier of the source master network entity.

5. The apparatus of claim 1, wherein the first relayed link comprises a first local link between the remote UE and the first relay UE, the second relayed link comprises a second local link between the remote UE and the second relay UE, and the first local link or the second local link comprises one of a sidelink, a peer-to-peer communication link, a device-to-device communication link, a Bluetooth link, or a Wi-Fi link.

6. The apparatus of claim 1, the at least one processor being further configured to:

detect a link failure in one of a first connection between the remote UE and the source master network entity or a second connection between the remote UE and the source secondary network entity; and transmit, to the source master network entity or the source secondary network entity, an indication of the link failure via the other of the first connection or the second connection.

7. The apparatus of claim 6, the at least one processor being further configured to:

receive, from the source master network entity or the source secondary network entity, an indication of a third entity change based on the link failure.

8. The apparatus of claim 6, wherein the transmission of the indication of the link failure is associated with a timer, and upon an expiry of the timer or a detection of the link failure in both the first connection and the second connection, the at least one processor is further configured to perform an RRC reestablishment procedure to recover from the link failure.

9. The apparatus of claim 1, further comprising a transceiver coupled to the at least one processor.

10. A method of wireless communication at a remote user equipment (UE), comprising:

transmitting, to at least one of a source master network entity or a target master network entity, an indication of a first entity change from the source master network entity to the target master network entity and a second entity change from a source secondary network entity to a target secondary network entity, the remote UE being connected to the source master network entity through a first relayed link via a first relay UE before the first entity change;

receiving, from the target master network entity, a measurement configuration during a radio resource control (RRC) reestablishment procedure with the target master network entity;

transmitting, to the target master network entity during the RRC reestablishment procedure, one or more measurements corresponding to the second entity change;

receiving, from the target master network entity, a dual connectivity configuration based on the transmitted one or more measurements, the dual connectivity configuration corresponding to the first entity change and the second entity change, the remote UE being connected to the target master network entity through a second relayed link via a second relay UE after the first entity change; and communicating with the target master network entity and the target secondary network entity based on the dual connectivity configuration.

11. The method of claim 10, further comprising:

performing the first entity change and the second entity change based on the dual connectivity configuration.

12. The method of claim 10, wherein the indication of the first entity change and the second entity change is transmitted via an RRC reestablishment procedure with the target master network entity.

13. The method of claim 10, wherein a RRC reestablishment request message of the RRC reestablishment procedure comprises at least one of an identifier of the remote UE associated with the source master network entity or an identifier of the source master network entity, and context information associated with the remote UE is forwarded from the source master network entity to the target master network entity based on the at least one of the identifier of the remote UE associated with the source master network entity or the identifier of the source master network entity.

14. The method of claim 10, wherein the first relayed link comprises a first local link between the remote UE and the first relay UE, the second relayed link comprises a second local link between the remote UE and the second relay UE, and the first local link or the second local link comprises one of a sidelink, a peer-to-peer communication link, a device-to-device communication link, a Bluetooth link, or a Wi-Fi link.

15. The method of claim 10, further comprising:

detecting a link failure in one of a first connection between the remote UE and the source master network entity or a second connection between the remote UE and the source secondary network entity; and transmitting, to the source master network entity or the source secondary network entity, an indication of the link failure via the other of the first connection or the second connection.

* * * * *